(12) United States Patent
Ito et al.

(10) Patent No.: US 8,774,397 B2
(45) Date of Patent: Jul. 8, 2014

(54) TELEPHONE AND VOICE ADJUSTMENT METHOD FOR TELEPHONE

(71) Applicant: Fujitsu Limited, Kawasaki (JP)

(72) Inventors: Shusaku Ito, Kawasaki (JP); Taro Togawa, Kawasaki (JP); Takeshi Otani, Kawasaki (JP); Yasuji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 13/630,344

(22) Filed: Sep. 28, 2012

(65) Prior Publication Data

US 2013/0259221 A1    Oct. 3, 2013

Related U.S. Application Data

(63) Continuation of application No. PCT/JP2010/055748, filed on Mar. 30, 2012.

(51) Int. Cl.
*H04M 1/00* (2006.01)
*H03G 3/00* (2006.01)

(52) U.S. Cl.
USPC ............. 379/390.03; 455/569.1; 381/107

(58) Field of Classification Search
None
See application file for complete search history.

(56) References Cited

U.S. PATENT DOCUMENTS

| | | | |
|---|---|---|---|
| 5,224,151 | A | 6/1993 | Bowen et al. |
| 2008/0137883 | A1 | 6/2008 | Araki |
| 2009/0116666 | A1* | 5/2009 | Ranta ............... 381/107 |
| 2009/0197615 | A1* | 8/2009 | Kim et al. ............ 455/456.1 |
| 2011/0003615 | A1* | 1/2011 | Langereis ............ 455/556.1 |

FOREIGN PATENT DOCUMENTS

| | | |
|---|---|---|
| JP | 5-183618 | 7/1993 |
| JP | 7-131268 | 5/1995 |
| JP | 8-116352 | 5/1996 |
| JP | 9-247260 | 9/1997 |
| JP | 2000-196725 | 7/2000 |
| JP | 2003-37651 | 2/2003 |
| JP | 2006-166116 | 6/2006 |
| JP | 2006-245799 | 9/2006 |
| JP | 2006-287557 | 10/2006 |
| WO | WO 03/077511 | 9/2003 |

OTHER PUBLICATIONS

Corrected version of International Search Report mailed Jun. 29, 2010 issued in corresponding International Patent Application No. PCT/JP2010/055748 (with PCT Notification of Transmittal of Translation mailed Nov. 1, 2012).
International Search Report of PCT/JP2010/055748 mailed Jun. 29, 2010.

* cited by examiner

*Primary Examiner* — Fan Tsang
*Assistant Examiner* — Jeffrey Lytle
(74) *Attorney, Agent, or Firm* — Staas & Halsey LLP

(57) ABSTRACT

A telephone includes: a housing; a voice output device that is placed inside the housing and produces voice; a contact detection unit that detects a position of an object that contacts the housing; a position offset calculation unit that calculates a distance between the contact position of the object detected by the contact detection unit and the voice output device; and a voice adjustment unit that adjusts the voice produced from the voice output device, depending on the distance.

20 Claims, 20 Drawing Sheets

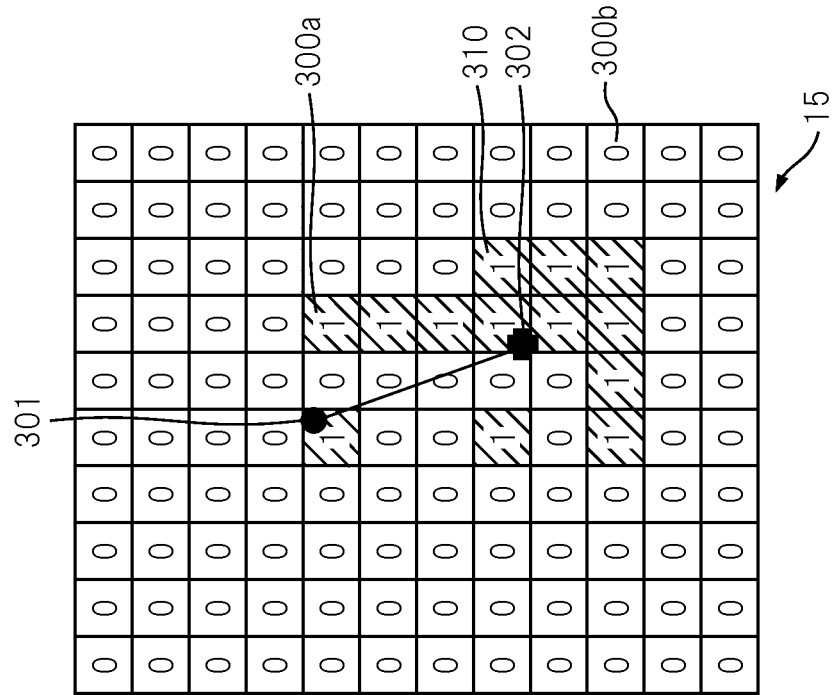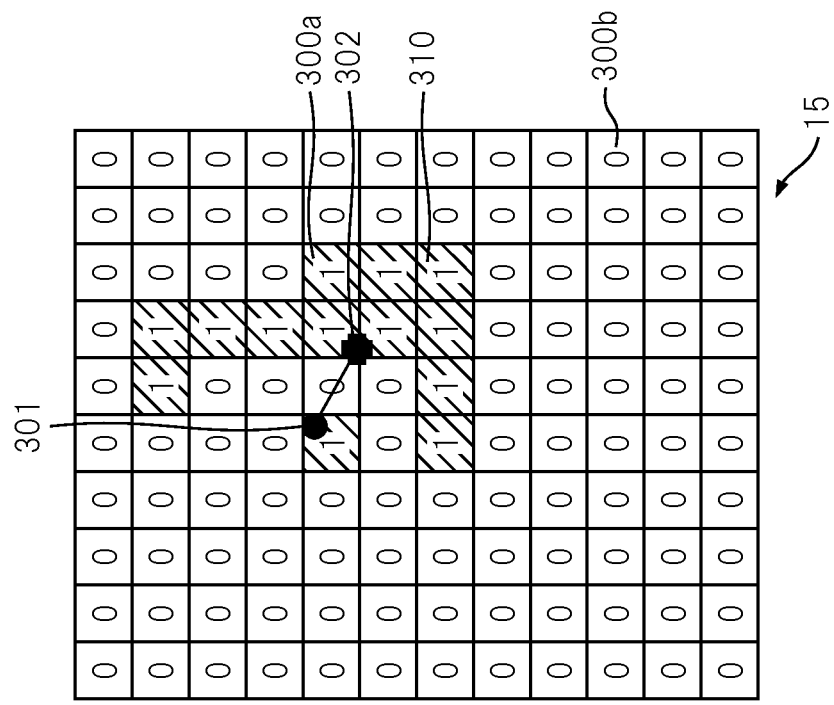

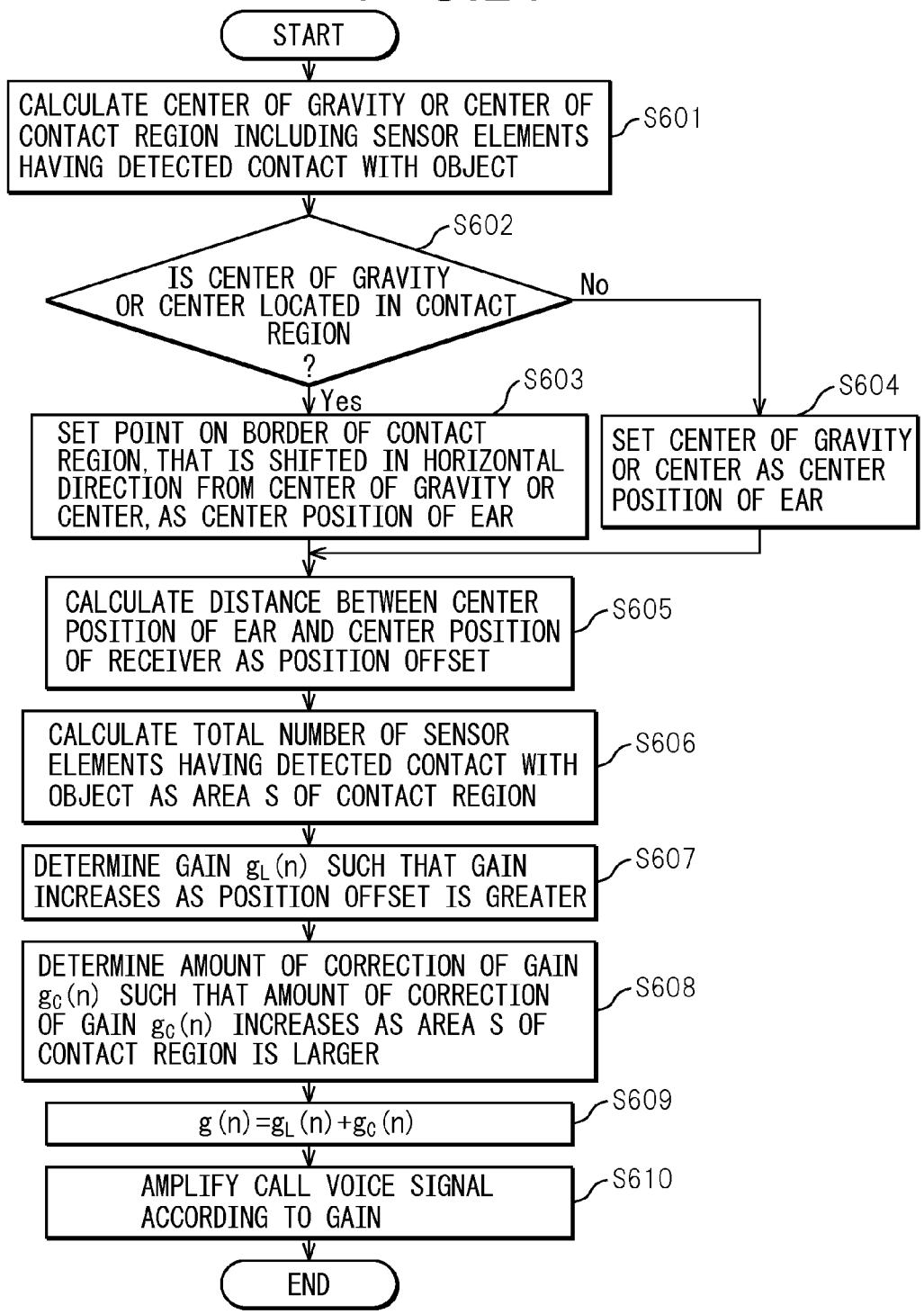

TELEPHONE AND VOICE ADJUSTMENT METHOD FOR TELEPHONE

CROSS-REFERENCE TO RELATED APPLICATION

This application is a continuation application and is based upon PCT/JP2010/055748, filed on Mar. 30, 2010, the entire contents of which are incorporated herein by reference.

FIELD

The embodiments discussed herein are related to a telephone and a voice adjustment method for a telephone that can adjust the volume or quality of voice that is produced from a voice output device.

BACKGROUND

In recent years, mobile phones have become popular. Mobile phones are portable, so that the user may make a call using a mobile phone in an environment where the background noise is loud, such as in the crowd. In this case, if the volume or quality of voice that is produced from the receiver, which is the voice output device of the mobile phone, is not adjusted adequately, the user has difficulty hearing the voice.

Therefore, a technique of detecting the pressure of the ear against the receiver and controlling the volume of the receiver depending on the pressure has been proposed (see, for example, Japanese Unexamined Patent Application Publication No. H5-183618 and Japanese Unexamined Patent Application Publication No. 2000-196725). A technique of measuring the distance from the mobile phone to the user by means of a distance sensor and controlling the volume of the receiver based on the distance has also been proposed (see, for example, Japanese Unexamined Patent Application Publication No. H9-247260).

SUMMARY

When calling on a mobile phone, the user holds the receiver close to an ear. However, the position of the ear may shift from the position of the receiver in a parallel to the front surface of the mobile phone or the surface of the receiver from which voice is produced. In this case, it is difficult for the voice produced from the receiver to reach the ear, and therefore it is difficult for the user to hear the voice produced from the receiver. However, none of the techniques described above detects the offset between the position of the receiver and the position of the user's ear. Consequently, when the position of the receiver and the position of the user's ear do not match, a telephone employing one of the above techniques cannot adequately adjust the volume or quality of voice produced from the receiver.

According to one embodiment, a telephone is provided, which includes: a housing; a voice output device that is placed inside the housing and produces voice; a contact detection unit that detects a position of an object that contacts with the housing; a position offset calculation unit that calculates a distance between the contact position of the object detected by the contact detection unit and the voice output device; and a voice adjustment unit that adjusts the voice produced from the voice output device, depending on the distance.

According to another embodiment, a voice adjustment method for a telephone including a housing, a voice output device that is placed inside the housing and produces voice, and a contact detection unit that detects the position of an object contacting with the housing, is provided. This voice adjustment method includes: calculating a distance between the contact position of the object detected by the contact detection unit and the voice output device; and adjusting the voice produced from the voice output device, depending on the distance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram illustrating an example of position relationship between the position where the ear contacts with the touch sensor, and the receiver.

FIG. 3B is a diagram illustrating another example of position relationship between the position where the ear contacts with the touch sensor, and the receiver.

FIG. 24 is an operation flowchart of a voice adjustment process according to a sixth embodiment.

DESCRIPTION OF EMBODIMENTS

Telephones according to various embodiments will be described below with reference to the accompanying drawings. This telephone detects the contact position or contact area of the user's ear and the telephones, and adjusts the volume or quality of voice to be produced from the receiver depending on the distance between the position of the user's ear and the receiver, or the contact area. Note that the telephones according the following embodiments will be mobile phones. However, according to other embodiments, the telephone may be a fixed telephone or a handset that communicates wirelessly with a fixed telephone.

Figure 1:
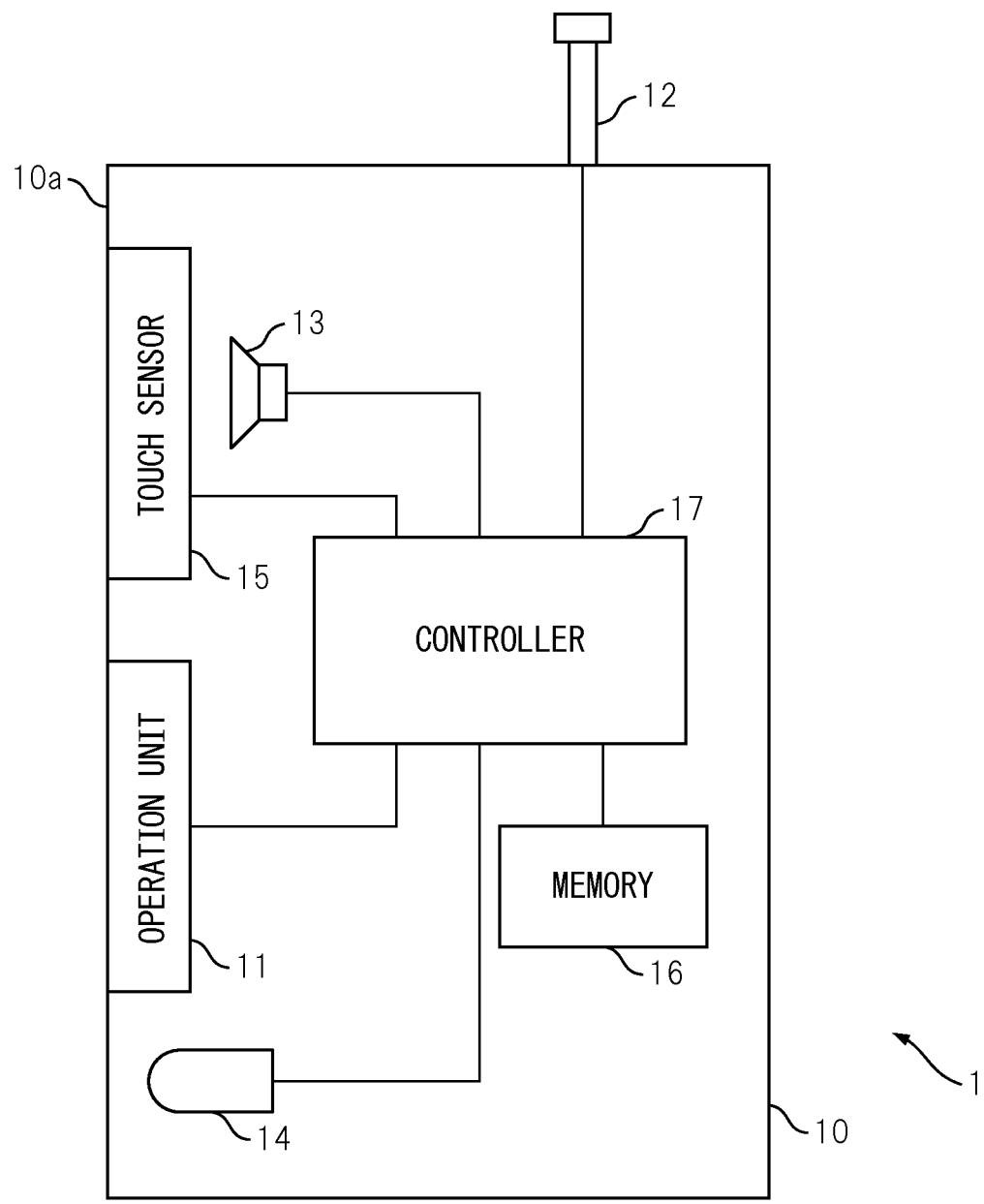
FIG. 1 is a schematic configuration diagram of a mobile phone according to the first embodiment.

FIG. 1 is a schematic configuration diagram of a mobile phone according to the first embodiment. The mobile phone 1 includes an operation unit 11, an antenna 12, a receiver 13, a microphone 14, a touch sensor 15, a memory 16, and a controller 17. The mobile phone 1 includes a housing 10 for accommodating the above described units. The operation unit 11, antenna 12, receiver 13, microphone 14, touch sensor 15 and memory 16 are each connected with the controller 17. Furthermore, the mobile phone 1 has a power supply unit (not illustrated) for supplying power to the controller 17 and so on, and a display unit (not illustrated) for displaying various kinds of information.

The operation unit 11 is used to allow the user to operate the mobile phone 1. The operation unit 11 has, for example, a plurality of key button switches that are provided in the front surface 10a of the housing 10. When the user presses one of the key button switches, the operation unit 11 sends an operation signal to correspond to the key button switch that is pressed, to the controller 17. The operation unit 11 may be, for example, formed integrally with a display unit, like a touch panel display.

The antenna 12 is used to allow the mobile phone 1 to communicate with a base station. The antenna 12 may be used to receive position measurement information from a global positioning system (GPS) satellite. The antenna 12 is attached to an upper part of the housing in a retractable fashion. The controller 17 receives a radio signal from a base station or a GPS satellite, via the antenna 12. The controller 17 also transmits a radio signal to a base station via the antenna 12.

The receiver 13 is an example of a voice output device, and, for example, receives voice signals such as the call voice, ringtone, or various sounds that are produced by various applications executed in the mobile phone 1, and outputs voice corresponding to these voice signal. The receiver 13 has an output surface that outputs voice, and is placed in an upper part inside the housing 10, so that the output surface is directed to the front surface 10a of the housing 10.

The microphone 14 collects ambient sounds including the voice produced from the user. The microphone 14 converts the collected ambient sounds into a voice signal having a magnitude corresponding to the volume of the ambient sounds, and transmits that voice signal to the controller 17.

The touch sensor 15 is an example of a contact detection unit, and detects contact with an object and outputs a contact position signal indicating the contact position, to the controller 17. The touch sensor 15 is placed nearer the front surface 10a of the housing 10 than the receiver 13, ahead of the front of the output surface of the receiver 13. In other words, the touch sensor 15 is placed between the receiver 13 and the front surface 10a of the housing 10. In addition, the touch sensor 15 has a plurality of sensor elements that are arranged in a two-dimensional arrangement so as to be able to output the coordinates of a plurality of positions contacting the user's ear at the same time. Furthermore, the intervals between these plurality of sensor elements are set smaller than the outer diameter of the ear, for example, approximately 1 mm to 10 mm. In addition, the touch sensor 15 preferably has a sensor surface having a size that is approximately equal to the regular size of the ear or a greater size, for example, a sensor surface that has a length of 30 mm to 50 mm in the horizontal direction and has a length of 70 mm to 100 mm in the vertical direction.

The touch sensor 15 may be, for example, a capacitive sensor or a pressure sensor. Alternately, the touch sensor 15 may be formed integrally with the operation unit 11 or a display unit, like a touch panel display.

Every time the touch sensor 15 detects contact with an object, or at fixed intervals (for example, every 0.1 second or every 1 second), the touch sensor 15 outputs a contact position signal representing the contact position to the controller 17. For example, for every sensor element provided in the touch sensor 15, the contact position signal includes a combination of the coordinates of that sensor element, and a flag to show whether or not that sensor element has detected contact with an object.

The memory 16 has, for example, a non-volatile semiconductor memory or a volatile semiconductor memory. The memory 16 stores various parameters that are used to determine the volume of the call voice, such as the coordinates of the center position of the receiver 13 with respect to a predetermined origin, and programs. The memory 16 also stores at least one application program to be executed on the mobile phone 1, and setting information to be used by such application programs, the user's personal setting information and various data.

The controller 17 has one or a plurality of processors and their peripheral circuits. The controller 17 performs a process of connecting the mobile phone 1 with a base station apparatus by wireless, and performs a communication process of communicating with other telephones, communication terminals or servers. In addition, as a call process, the controller 17 produces a voice signal from a radio signal that is received from another telephone via the base station apparatus and the antenna 12, and outputs the voice signal to the receiver 13. Furthermore, the controller 17 generates a radio signal including the voice signal received from the microphone 14, and outputs the radio signal to the base station apparatus via the antenna 12. Furthermore, in response to operations via the operation unit 11, the controller 17 executes processes related to various applications implemented on the mobile phone 1.

In addition, while the call process is being executed, the controller 17 adjusts the volume of the call voice depending on the position of an object detected by the touch sensor 15. Note that the volume of the call voice will be hereinafter simply referred to as "in-call volume".

Figure 2:
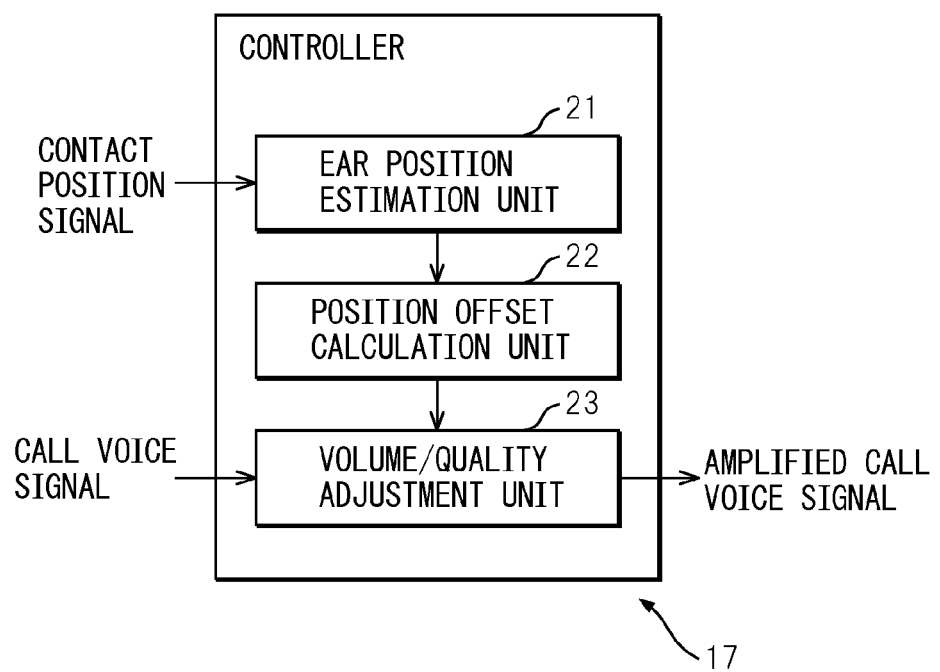
FIG. 2 is a schematic configuration diagram of a controller related to functions for adjusting voice.

FIG. 2 is a schematic configuration diagram of a controller 17 related to functions for adjusting voice. The controller 17 includes an ear position estimation unit 21, a position offset calculation unit 22, and a volume/quality adjustment unit 23. These units provided in the controller 17 are implemented as a computer program to be executed on a processor provided in the controller 17. Alternately, these units provided in the controller 17 may be mounted as separate operation circuits in the mobile phone 1, or may be mounted in the mobile phone 1 as one operation circuit to implement the functions of these units.

The ear position estimation unit 21 estimates the center position of the ear, based on a contact position signal that is received from the touch sensor 15 while the controller 17 is executing the call process.

While the controller 17 is executing the call process, i.e., while the user is making a call, the user holds the receiver 13 close to the ear. The touch sensor 15 is placed ahead of the receiver 13. Consequently, while the user is calling, the object to contact the touch sensor 15 is estimated to be the user's ear.

When the user's earhole is close to the receiver 13, the majority of the voice that is produced from receiver 13 reaches the user's eardrum, so that the user is able to easily hear the voice that is produced from the receiver 13. However, when the user's earhole is far from the receiver 13, the sound that is produced from receiver 13 has difficulty reaching the user's eardrum. As a result, it is difficult that the user hears the voice that is produced from the receiver 13.

FIG. 3A is a diagram illustrating an example of the position relationship between the position where the ear contacts with the touch sensor 15, and the receiver. FIG. 3B is a diagram illustrating another example of the position relationship between the position where the ear contacts with the touch sensor 15, and the receiver. Each block illustrated in FIG. 3A and FIG. 3B corresponds to one sensor element provided in the touch sensor 15. Among these blocks, the block 300a, in which "1" is written, indicates that the corresponding sensor element is in contact with an object. On the other hand, the block 300b, in which "0" is written, indicates that the corresponding sensor element does not contact an object. In addition, the black dot 301 indicates the center position of the receiver 13. Furthermore, the cross mark 302 indicates the center of gravity of the region 310 corresponding to all of the sensor elements having detected contact with an object. Note that, in the following, the region corresponding to all of sensor elements having detected contact with an object will be referred to as "contact region".

As described earlier, while the user is calling, there is a high possibility that the object contacting the touch sensor 15 is the user's ear. Then, since the earlobe projects from the user's head more than the earhole, there is a possibility that the part of the ear which contacts with the touch sensor 15 is the earlobe. In addition, the earhole is located approximately in the center of the ear. Consequently, as illustrated in FIG. 3A and FIG. 3B, the center of gravity 302 of the contact region 310 of a semi-arc shape is estimated to be located near the center of the ear. For example, as illustrated in FIG. 3A, when the distance L between the center of gravity 302 of the contact region 310 and the center position 301 of the receiver 13 is short, the earhole is close to the receiver 13. On the other hand, as illustrated in FIG. 3B, when the distance L between center of gravity 302 of the contact region 310 and the center position 301 of the receiver 13 is long, the earhole is far from the receiver 13.

Therefore, the ear position estimation unit 21 calculates the center of gravity of the contact region, based on the contact position signal, in accordance with the following equations, and estimates that center of gravity as the center position of the ear corresponding to the earhole.

$$X_G = \sum_{i=1}^{N} X_i / N \quad (1)$$

$$Y_G = \sum_{i=1}^{N} Y_i / N$$

$X_i$ (i=1, 2, ..., N) is the horizontal coordinate value of a sensor element having detected contact with an object, on a surface that is parallel to the front surface 10a of the housing 10. $Y_i$ is the vertical coordinate value of a sensor element having detected contact with an object, on a surface that is parallel to the front surface 10a of the housing 10. In addition, N is the total number of sensor elements having detected contact with an object. Then, $(X_G, Y_G)$ are the horizontal and vertical coordinates of the center of gravity of a contact region, on a surface that is parallel to the front surface 10a of the housing 10.

In addition, the earlobe has a semi-elliptical shape, and the earhole is located in approximately the center of the semi-ellipse. Therefore, the ear position estimation unit 21 may approximate the contact region by an ellipse, and assume that the center position of the semi-ellipse is the center position of the ear.

Figure 4:
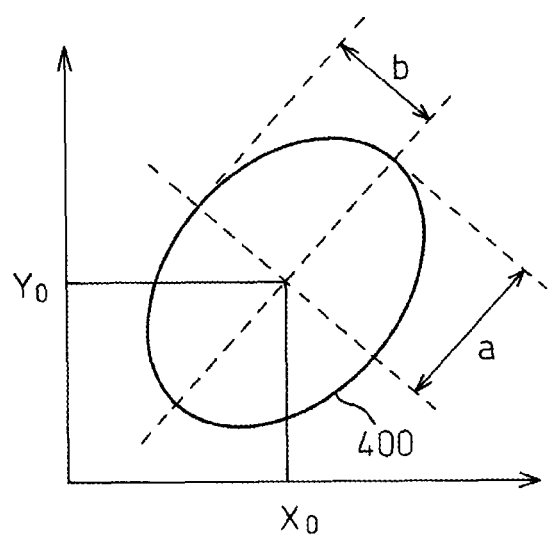
FIG. 4 is a diagram illustrating parameters of an ellipse when the shape of the ear is approximated by an ellipse.

FIG. 4 is a diagram illustrating the parameters of an ellipse when the shape of the ear is approximated by an ellipse. In FIG. 4, the horizontal and vertical coordinates of the center of the ellipse 400 are represented by Xo and Yo, respectively. The radius of the ellipse 400 in the long axis direction is represented as "a," and the radius in the short axis direction is represented as "b."

In this case, it is assumed that each sensor element that is in contact with an object exists on an ellipse given by the following equation:

$$X^2 + AXY + BY^2 + CX + DY + E = 0 \quad (2)$$

X and Y are the horizontal coordinate and vertical coordinate on a surface that is parallel to the front surface 10a of the housing 10. A to E are parameters to specify the shape of the ellipse. In this case, the parameters A to E are calculated by the following equation.

$$\begin{pmatrix} A \\ B \\ C \\ D \\ E \end{pmatrix} = \begin{pmatrix} \Sigma X_i^2 Y_i^2 & \Sigma X_i^2 Y_i^3 & \Sigma X_i^2 Y_i & \Sigma X_i Y_i^2 & \Sigma X_i Y_i \\ \Sigma X_i Y_i^3 & \Sigma Y_i^4 & \Sigma X_i Y_i^2 & \Sigma Y_i^3 & \Sigma Y_i^2 \\ \Sigma X_i^2 Y_i & \Sigma X_i Y_i^2 & \Sigma X_i^2 & \Sigma X_i Y_i & \Sigma X_i \\ \Sigma X_i Y_i^2 & \Sigma Y_i^3 & \Sigma X_i Y_i & \Sigma Y_i^2 & \Sigma Y_i \\ \Sigma X_i Y_i & \Sigma Y_i^2 & \Sigma X_i & \Sigma Y_i & \Sigma 1 \end{pmatrix}^{-1} \begin{pmatrix} -\Sigma X_i^3 Y_i \\ -\Sigma X_i^2 Y_i^2 \\ -\Sigma X_i^3 \\ -\Sigma X_i^2 Y_i \\ -\Sigma X_i^2 \end{pmatrix} \quad (3)$$

$X_i$ (i=1, 2, ..., N) is the horizontal coordinate value of a sensor element having detected contact with an object, on a surface that is parallel to the front surface 10a of the housing 10. $Y_i$ (i=1, 2, ..., N) is the vertical coordinate value of a sensor element having detected contact with an object, on a surface that is parallel to the front surface 10a of the housing 10. Also, N is the total number of sensor elements having detected contact with an object.

Consequently, the ear position estimation unit 21 calculates the horizontal coordinate Xo and vertical coordinate Yo of the center of the ellipse, using the parameters A to E, in accordance with the following equation, as the center position of the ear. In this case, the radius a of the long axis direction and the radius b of the short axis direction are represented as follows, based on Xo and Yo:

$$X_0 = \frac{AD - 2BC}{4B - A^2} \quad (4)$$

$$Y_0 = \frac{AC - 2D}{4B - A^2}$$

$$\theta = \frac{\tan^{-1}\left(\frac{A}{1-B}\right)}{2}$$

$$a = \sqrt{\frac{(X_0\cos\theta + Y_0\sin\theta)^2 - E\cos^2\theta -}{\{(X_0\sin\theta - Y_0\cos\theta)^2 - E\sin^2\theta\}\frac{\sin^2\theta - B\cos^2\theta}{\cos^2\theta - B\sin^2\theta}}}$$

$$b = \sqrt{\frac{(X_0\sin\theta - Y_0\cos\theta)^2 - E\sin^2\theta -}{\{(X_0\cos\theta + Y_0\sin\theta)^2 - E\cos^2\theta\}\frac{\cos^2\theta - B\sin^2\theta}{\sin^2\theta - B\cos^2\theta}}}$$

Since the earhole itself is dented deeper than the earlobe, the earhole does not contact the touch sensor 15. Consequently, the center position of the ear is not located in the contact region. Therefore, when the center of gravity of the contact region or the center of the contact region determined by elliptical approximation is located in the contact region, the ear position estimation unit 21 sets a point on the border of the contact region near the center of gravity or the center of the contact region, or a point near the border as the center position of the ear. For example, the ear position estimation unit 21 sets a point on the border of the contact region that is shifted in the horizontal direction from the center of gravity or the center of the contact region, as the center position of the ear. In addition, when the contact region has a semi-arc shape, the center position of the ear is more likely to be located on the inner side of that arc, rather than on the outer side the arc. Therefore, of two points on the border of the contact region that are shifted in the horizontal direction from the center of gravity or the center of the contact region, the ear position estimation unit 21 preferably sets the point that is closer to the midpoint between the left edge and the right edge of the contact region as the center position of the ear.

The ear position estimation unit 21 outputs the horizontal coordinate and vertical coordinate of the center position of the ear, to the position offset calculation unit 22.

The position offset calculation unit 22 calculates the distance L between the center position of the ear and the receiver 13, along the direction that is parallel to the front surface 10a of the housing 10, in accordance with the following equation, and determines the distance L as the position offset between the center position of the ear and the receiver 13.

$$L = \sqrt{(X_e - X_{re})^2 + (Y_e - Y_{re})^2} \quad (5)$$

$(X_e, Y_e)$ are the horizontal and vertical coordinates of the center position of the ear, on a surface that is parallel to the front surface 10a of the housing 10. $(X_{re}, Y_{re})$ are the horizontal and vertical coordinates of the center position of the receiver 13, on a surface that is parallel to the front surface 10a of the housing 10.

The position offset calculation unit 22 outputs the position offset L to the volume/quality adjustment unit 23.

The volume/quality adjustment unit 23 is an example of a voice adjustment unit, and adjusts the in-call volume depending on the position offset L between the center position of the ear and the receiver 13.

Generally speaking, as the position offset L is greater, it is more difficult that the call voice produced from the receiver 13 reaches the user's eardrum. Therefore, as the position offset is greater, the volume/quality adjustment unit 23 increases the gain, which is the amount of amplification, for the in-call voice.

Figure 5:
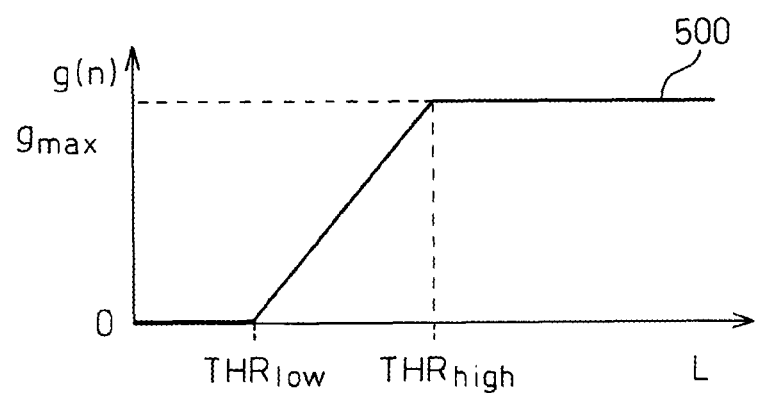
FIG. 5 is a graph illustrating relationship between the position offset between the center position of the ear and the receiver, and gain.

FIG. 5 is a graph illustrating the relationship between the position offset between the center position of the ear and the receiver, and gain. In FIG. 5, the horizontal axis represents the position offset L, and the vertical axis represents the gain g(n). The graph 500 illustrates the gain g(n) versus the position offset L.

As illustrated in FIG. 5, when the position offset L is lower than a threshold value $THR_{low}$, the volume/quality adjustment unit 23 sets the gain g(n) to 0. On the other hand, when the position offset L is equal to or greater than a threshold value $THR_{high}$, the volume/quality adjustment unit 23 sets the gain g(n) to the maximum gain $g_{max}$. Then, when the position offset L is equal to or greater than the threshold value $THR_{low}$ and is lower than $THR_{high}$, the volume/quality adjustment unit 23 increases the gain g(n) monotonously as the position offset L increases greater. For example, the volume/quality adjustment unit 23 increases the gain g(n) linearly as the position offset L becomes greater. Then, when the position offset L is a midpoint between $THR_{low}$ and $THR_{high}$, the volume/quality adjustment unit 23 sets the gain g(n) to $g_{max}/2$. Note that n is the number of a sample point of the call voice. In addition, the maximum gain $g_{max}$ is set, for example, to 10 dB. Then, when the position offset L is equal to or greater than the threshold value $THR_{low}$ and is lower than $THR_{high}$, the volume/quality adjustment unit 23 may increase the gain g(n) non-linearly such as a logarithmic function or a sigmoid function, as the position offset L increases greater.

Note that the threshold value $THR_{low}$ is set to a value corresponding to the radius or diameter of the earhole—for example, 5 mm. In other words, when the distance between the center of the ear and the receiver 13 is less than a diameter of the earhole, the majority of the call voice produced from the receiver 13 reaches the eardrum of the ear directly, so that the gain is set to the minimum.

On the other hand, the threshold value $THR_{high}$ is set to a value corresponding to the distance from the earhole to the earlobe, for example, 40 mm. In other words, when the receiver 13 is located so distant from the center position of the ear to be located outside the earlobe, the gain is set to the maximum. Alternately, when the center position of the ear is calculated by approximating an ellipse, the threshold value $THR_{high}$ may be set to the radius a of the ellipse found by ellipse approximation in the long axis direction, or may be set to the radius in the vertical direction from the center of the ellipse.

The volume/quality adjustment unit 23 amplifies the call voice signal in accordance with the following equation using gain g(n).

$$y(n) = 10^{g(n)/20} \cdot x(n) \quad (6)$$

x(n) is a call voice signal that is produced from a radio signal that is received from another telephone, and y(n) is the amplified call voice signal. In addition, n represents the n-th sampling point of the call voice signal. As clear from equation (6), when the gain g(n) is 0, the call voice signal is not amplified. Then, as the gain g(n) increases greater, the call voice signal is more amplified.

The volume/quality adjustment unit 23 outputs the amplified call voice signal to the receiver 13.

Figure 6:
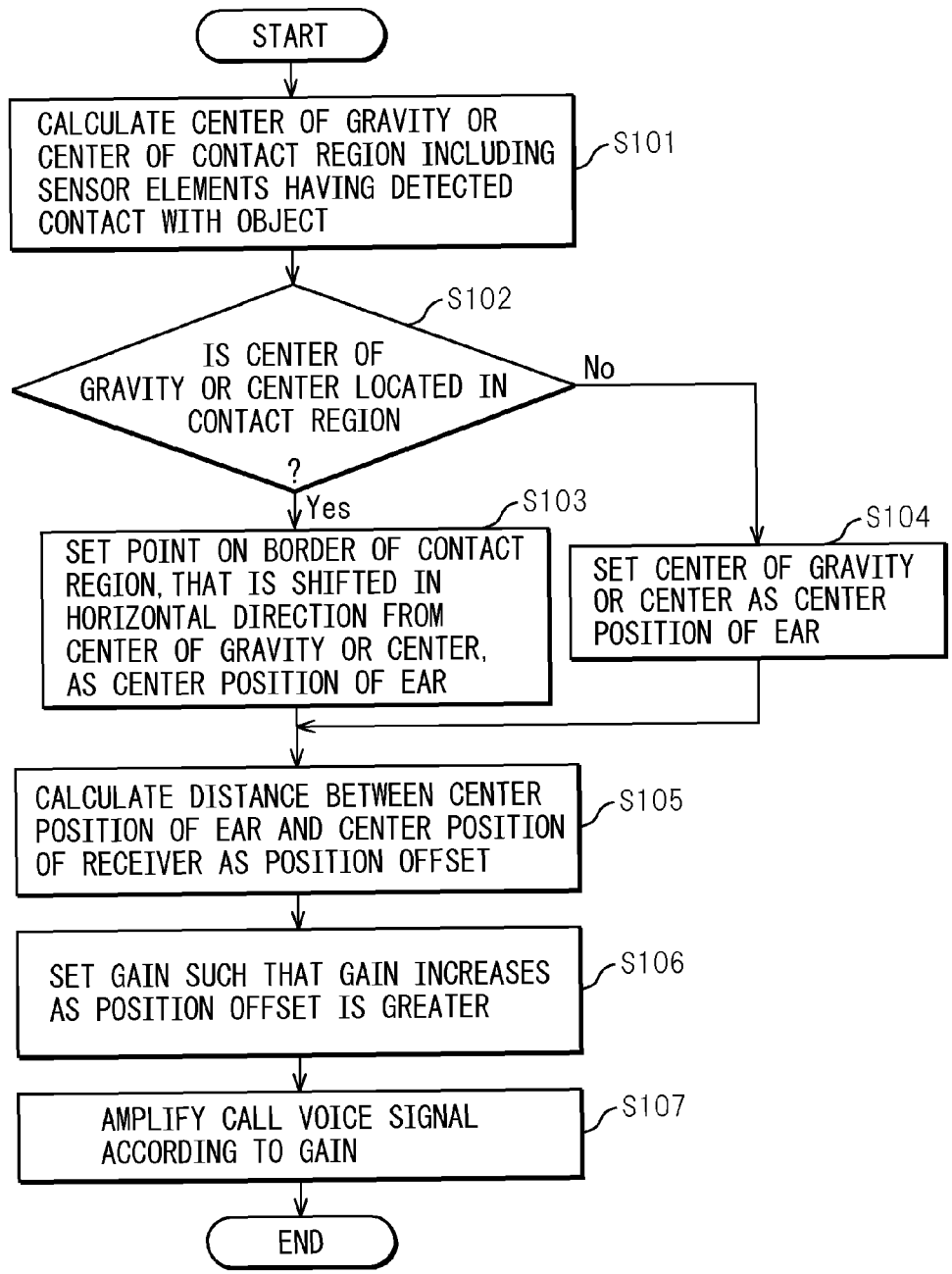
FIG. 6 is an operation flowchart of a voice adjustment process according to the first embodiment.

FIG. 6 is an operation flowchart of a voice adjustment process according to the first embodiment. This voice adjustment process is controlled by the controller 17.

Based on a contact position signal that is received from the touch sensor 15, the ear position estimation unit 21 of the controller 17 finds the center of gravity or center of a contact region including a sensor element having detected contact with an object (step S101). The ear position estimation unit 21 determines whether or not the center of gravity or center is located in the contact region (step S102). When the center of gravity or center is not located in the contact region (step S102—No), the ear position estimation unit 21 determines that the center of gravity or center is the center position of the ear (step S103). On the other hand, when the center of gravity or center is located in the contact region (step S102—Yes), the ear position estimation unit 21 determines that the border of the contact region having moved in the horizontal direction from the center of gravity or center is the ear center position (step S104). After step S103 or S104, the ear position estimation unit 21 outputs the center position of the ear to the position offset calculation unit 22 of the controller 17.

The position offset calculation unit 22 calculates the distance between the center position of the receiver 13 that is stored in the memory 16, and the center position of the ear, on a surface that is parallel to the front surface 10a of the housing 10, as the position offset (step S105). Then, the position offset calculation unit 22 outputs the position offset to the volume/quality adjustment unit 23 of the controller 17.

The volume/quality adjustment unit 23 determines the gain such that, when the position offset is greater, the gain is also greater (step S106). Then, the volume/quality adjustment unit 23 amplifies the call voice signal depending on the determined gain (step S107).

The volume/quality adjustment unit 23 outputs the amplified call voice signal, to the receiver 13.

For example, during execution of the call process, the controller 17 executes the processes of steps S101 to S106 of this voice adjustment process, every predetermined period of time—for example, every 10 seconds, 30 seconds or 1 minute. Alternately, every time an object contacting the touch sensor 15 is detected, the controller 17 may execute the processes of steps S101 to S106 of this voice adjustment process. In addition, the controller 17 executes the process of step S107 for each call voice sample point.

As described above, the mobile phone according to the first embodiment estimates the center position of the ear, from the position of the user's ear detected by a touch sensor that is placed near the front surface of the housing. Then, this mobile phone increases the gain of the call voice signal to be output from the receiver, as the position offset between the center position of the ear and the receiver on a surface that is parallel to the front surface of the housing increases greater. Consequently, this mobile phone is able to adequately adjust the in-call volume depending on the difference between the position of the user's ear and the position of the receiver.

Next, a mobile phone according to a second embodiment will be described. The mobile phone according to the second embodiment adjusts the call voice signal, per frequency band, depending on the position offset between the user's ear and the receiver.

Note that, comparing the mobile phone according to the second embodiment with the mobile phone according to the first embodiment, only the processes to be executed by the controller are different. Therefore, the controller of the mobile phone according to the second embodiment will be described below. As for the details of the other components of the mobile phone according to the second embodiment, see FIG. 1 and the descriptions of corresponding components in the mobile phone according to the first embodiment.

Figure 7:
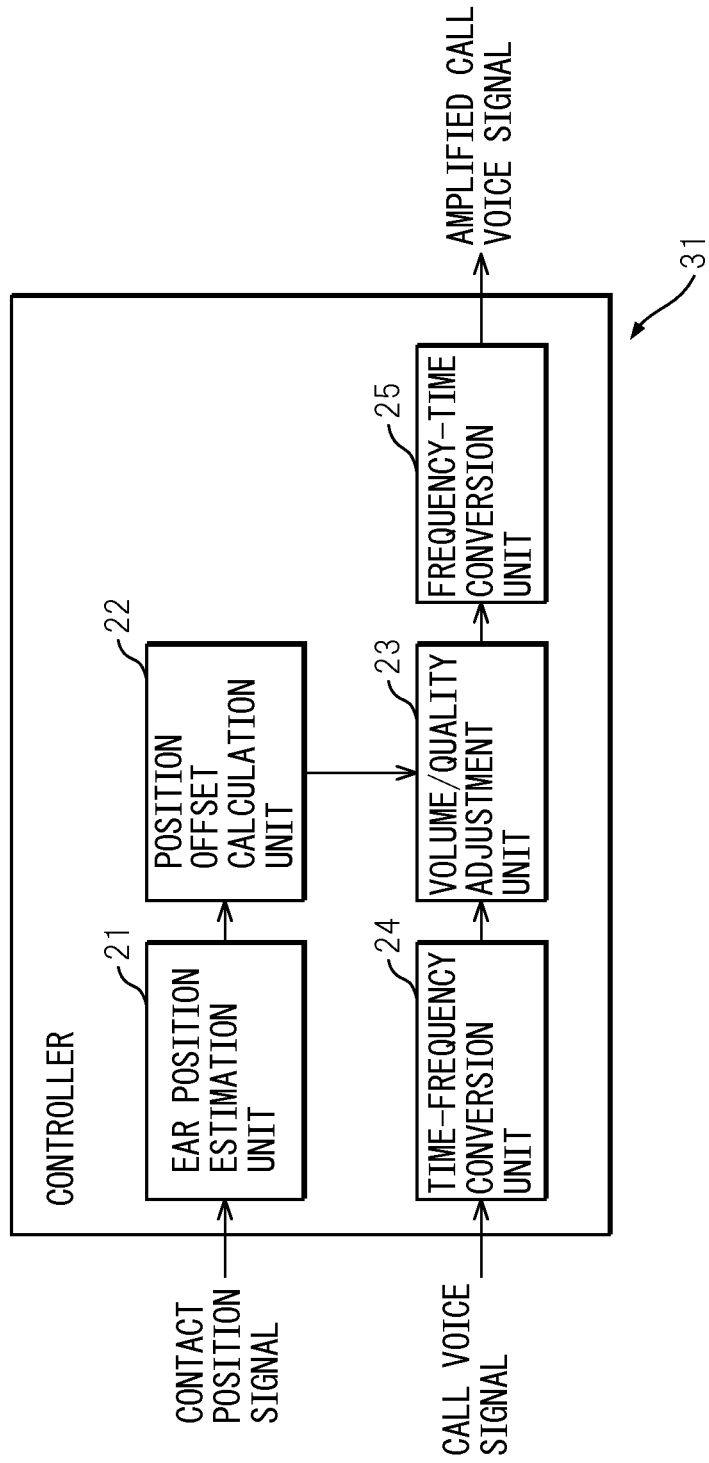
FIG. 7 is a schematic configuration diagram of a controller of a mobile phone related to functions for adjusting voice according to a second embodiment.

FIG. 7 is a schematic configuration diagram of the controller of the mobile phone related to functions for adjusting voice according to the second embodiment.

The controller 31 includes an ear position estimation unit 21, a position offset calculation unit 22, a volume/quality adjustment unit 23, a time-frequency conversion unit 24, and a frequency-time conversion unit 25. These units provided in the controller 31 are implemented as a computer program to be executed on a processor provided in the controller 31. Alternately, the units provided in the controller 31 may be mounted as separate operation circuits in the mobile phone 1, or may be mounted in the mobile phone 1 as one operation circuit to implement the functions of these units.

Note that, in FIG. 7, the units of the controller 31 are assigned the same reference numerals as the reference numerals of the corresponding components in the controller 17 of the mobile phone according to the first embodiment illustrated in FIG. 2. Among the individual units of the controller 31, the ear position estimation unit 21 and the position offset calculation unit 22 are the same as the ear position estimation unit 21 and the position offset calculation unit 22 of the controller 17. Consequently, the volume/quality adjustment unit 23, time-frequency conversion unit 24 and frequency-time conversion unit 25 will be described below.

The time-frequency conversion unit 24 generates a frequency signal by performing time-to-frequency conversion of a call voice signal that is produced from a radio signal received from a base station via the antenna 12, in predetermined frame units. The time-frequency conversion unit 24 may use, for example, fast Fourier transform for the time-to-frequency conversion. Alternately, the time-frequency conversion unit 24 may use discrete cosine transform or modified discrete cosine transform for the time-to-frequency conversion. In addition, the length of a frame is set, for example, to 20 milliseconds. The time-frequency conversion unit 24 outputs the generated frequency signal to the volume/quality adjustment unit 23.

The volume/quality adjustment unit 23 adjusts the volume and quality of the call voice by amplifying the frequency signal, per frequency band, depending on the position offset L between the center position of the ear and the receiver 13.

As the position offset is greater, the volume/quality adjustment unit 23 increases the gain for the frequency band corresponding to human voice. In addition, generally speaking, the sound of a lower frequency attenuates as the position offset L becomes greater. Therefore, the volume/quality adjustment unit 23 increases the gain as the frequency decreases lower.

Figure 8:
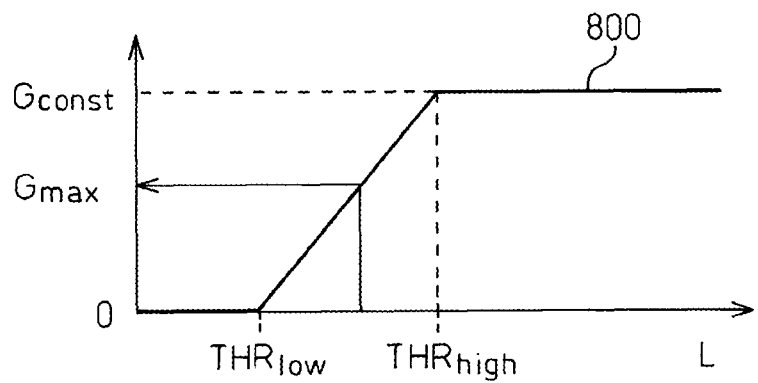
FIG. 8 is a graph illustrating relationship between the position offset between the center position of the ear and the receiver, and the maximum gain.

FIG. 8 is a graph illustrating the relationship between the position offset between the center position of the ear and the receiver, and the maximum gain. In FIG. 8, the horizontal axis represents the position offset L, and the vertical axis represents the maximum value $G_{max}$ of gain. The graph 800 is the maximum value $G_{max}$ of gain versus the position offset L.

As illustrated in FIG. 8, when the position offset L is lower than the threshold value $THR_{low}$, the volume/quality adjustment unit 23 sets the maximum gain value $G_{max}$ to 0. On the other hand, when the position offset L is equal to or greater than the threshold value $THR_{high}$, the volume/quality adjustment unit 23 sets the maximum value of gain $G_{max}$ to a predetermined value $G_{const}$. Note that the predetermined value $G_{const}$ is set, for example, to 10 dB. Then, when the position offset L is equal to or greater than the threshold value $THR_{low}$ and is lower than $THR_{high}$, the volume/quality adjustment unit 23 increases the maximum value of gain $G_{max}$ monotonously as the position offset L increases greater. For example, as the position offset L becomes greater, the volume/quality adjustment unit 23 increase the maximum value of gain $G_{max}$ linearly. Then, when the position offset L is a midpoint between $THR_{low}$ and $THR_{high}$, the volume/quality adjustment unit 23 sets the maximum value of gain $G_{max}$ to $G_{const}/2$. In addition, when the position offset L is equal to or greater than the threshold value $THR_{low}$ and is lower than $THR_{high}$, the volume/quality adjustment unit 23 may increase the maximum value of gain $G_{max}$ non-linearly, such as a logarithmic function or a sigmoid function, as the position offset L increases greater.

Note that the threshold values $THR_{low}$ and $THR_{high}$ are set the same as the threshold values $THR_{low}$ and $THR_{high}$ for determining the gain g(n) in the volume/quality adjustment unit 23 according to the first embodiment.

Next, the volume/quality adjustment unit 23 determines gain per frequency band. The volume/quality adjustment unit 23 determines the gain of each frequency band so as to be able to selectively amplify a frequency band that is prone to attenuate, as the position offset L increases greater.

Figure 9:
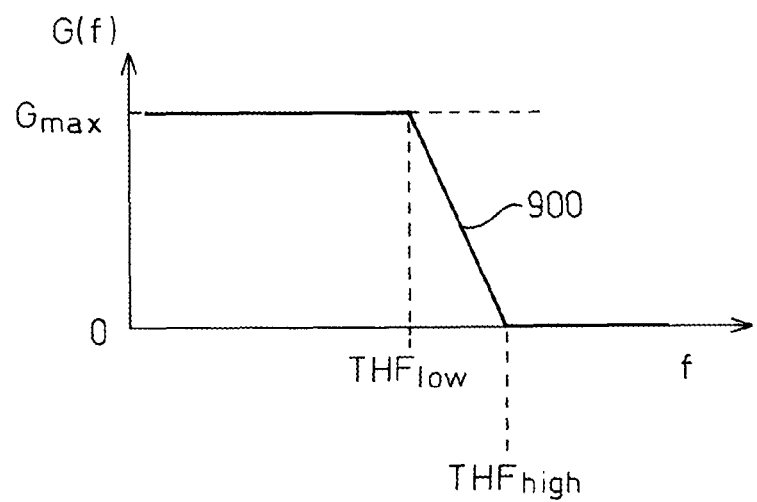
FIG. 9 is a graph illustrating an example of relationship between frequency and gain.

FIG. 9 is a graph illustrating an example of a graph illustrating the relationship between frequency and gain. In FIG. 9, the horizontal axis represents the frequency f, and the vertical axis represents the gain G(f). The graph 900 illustrates gain the G(f) versus the frequency f.

As illustrated in FIG. 9, when the frequency f is lower than the threshold value $THF_{low}$, the volume/quality adjustment unit 23 sets the gain G(f) to the maximum gain $G_{max}$. On the other hand, when the frequency f is equal to or greater than the threshold value $THF_{high}$, the volume/quality adjustment unit 23 sets the gain G(f) to 0. Then, when the frequency f is equal to or greater than the threshold value $THF_{low}$ and is lower than $THF_{high}$, the volume/quality adjustment unit 23 makes the gain G(f) decrease monotonously as the frequency f increases higher. For example, as the frequency f increases higher, the volume/quality adjustment unit 23 makes the gain G(f) decrease linearly. Then, when the frequency f is a midpoint between $THF_{low}$ and $THF_{high}$, the volume/quality adjustment unit 23 sets the gain G(f) to $G_{max}/2$. Further, when the frequency f is equal to or greater than the threshold value $THF_{low}$ and is lower than $THF_{high}$, the volume/quality adjustment unit 23 may make the gain G(f) decrease non-linearly as the frequency f increase higher.

As a result, the gain for a lower frequency band than the threshold value $THF_{high}$ becomes greater than the gain for a higher frequency band than the threshold value $THF_{high}$, as the position offset L increases greater.

Note that, for example, the threshold value $THF_{high}$ may be set to an upper limit frequency of a frequency band that is more prone to attenuate than other frequency bands, as the distance between the receiver 13 and the ear becomes longer, for example, somewhere in a range from 1000 Hz to 3000 Hz. On the other hand, the threshold value $THF_{low}$ is set to a lower value than the threshold value $THF_{high}$. For example, the threshold value $THF_{low}$ is set to 1250 Hz, and the threshold value $THF_{high}$ is set to 2000 Hz.

Alternately, the volume/quality adjustment unit 23 is may be unable to increase gain monotonously, due to limitations such as the upper limit of digital clip. However, the volume/quality adjustment unit 23 is able to increase the user's subjective volume by selectively amplifying the signal of a frequency band that is important to human voice or hearing.

Figure 10:
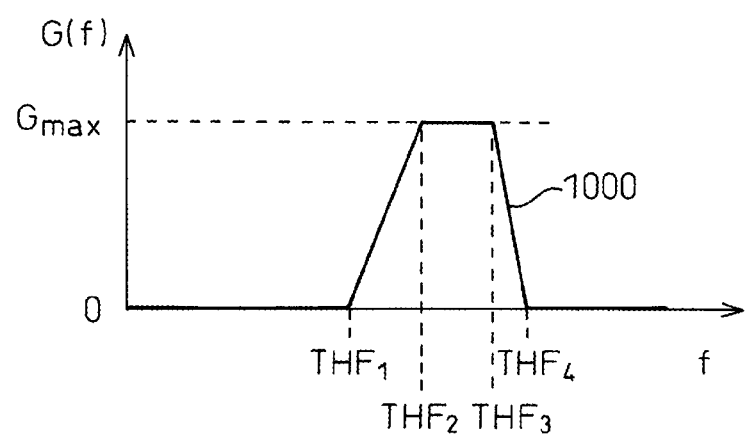
FIG. 10 is a graph illustrating another example of relationship between frequency and gain.

FIG. 10 is a graph illustrating another example of the relationship between frequency and gain. In FIG. 10, the horizontal axis represents the frequency f, and the vertical axis represents the gain G(f). The graph 1000 represents the gain G(f) versus the frequency f.

As illustrated in FIG. 10, when the frequency f is lower than a threshold value $THF_1$ or is equal to or greater than $THF_4$, the volume/quality adjustment unit 23 sets the gain G(f) to 0. On the other hand, when the frequency f is equal to or greater than the threshold value $THF_2$ and is lower than $THF_3$, the volume/quality adjustment unit 23 sets the gain G(f) to the maximum gain $G_{max}$. Then, when the frequency f is equal to or greater than the threshold value $THF_1$ and is lower than $THF_2$, the volume/quality adjustment unit 23 increases the gain G(f) monotonously as the frequency f increases higher. For example, the volume/quality adjustment unit 23 increases the gain G(f) linearly as the frequency f increases higher. Then, when the position offset L is a midpoint between $THF_1$ and $THF_2$, the volume/quality adjustment unit 23 sets the gain G(f) to $G_{max}/2$. Further, when the frequency f is equal to or greater than the threshold value $THF_3$ and is lower than $THF_4$, the volume/quality adjustment unit 23 makes the gain G(f) decrease monotonously as the frequency f increase higher. For example, as the frequency f increases higher, the volume/quality adjustment unit 23 makes the gain G(f) decrease linearly. Then, when the frequency f is a midpoint between $THF_3$ and $THF_4$, the volume/quality adjustment unit 23 sets the gain G(f) to $G_{max}/2$.

As a result of this, the gain for a frequency band that is higher than the threshold value $THF_1$ and is lower than the threshold value $THF_4$ becomes greater than the gain for a frequency band that is lower than the threshold value $THF_1$ and a frequency band that is higher than the threshold value $THF_4$, as the position offset L is greater.

Note that the threshold values $THF_1$ to $THF_4$ are set to hold $THF_1 < THF_2 < THF_3 < THF_4$, within a range between, for example, 1000 Hz and 3500 Hz. For example, the threshold values $THF_1$ to $THF_4$ are set to 2000 Hz, 2200 Hz, 3000 Hz, 3200 Hz, respectively.

The volume/quality adjustment unit 23 amplifies the frequency signal, in accordance with the following equation, using the gain G(f) that is determined with respect to each frequency band f.

$$Y(f) = 10^{G(f)/20} \cdot X(f) \qquad (7)$$

X(f) is the frequency signal of the frequency band f, and Y(f) is an amplified frequency signal of the frequency band f. As clear from equation 7, when the gain G(f) is 0, the frequency signal is not amplified. Then, as the gain G(f) increases greater, the frequency signal is more amplified. The volume/quality adjustment unit 23 outputs the amplified frequency signal to the frequency-time conversion unit 25.

The frequency-time conversion unit 25 generates an amplified call voice signal by performing frequency-to-time conversion of the amplified frequency signal in predetermined frame units. The frequency-time conversion unit 25 may utilize the inverse transform of the time-to-frequency conversion used in the time-frequency conversion unit 24, for the frequency-to-time conversion. Further, the length of a frame corresponds to the length of a frame, which is the unit of the time-to-frequency conversion executed by the time-frequency conversion unit 24. The frequency-time conversion unit 25 outputs the amplified call voice signal to the receiver 13.

Figure 11:
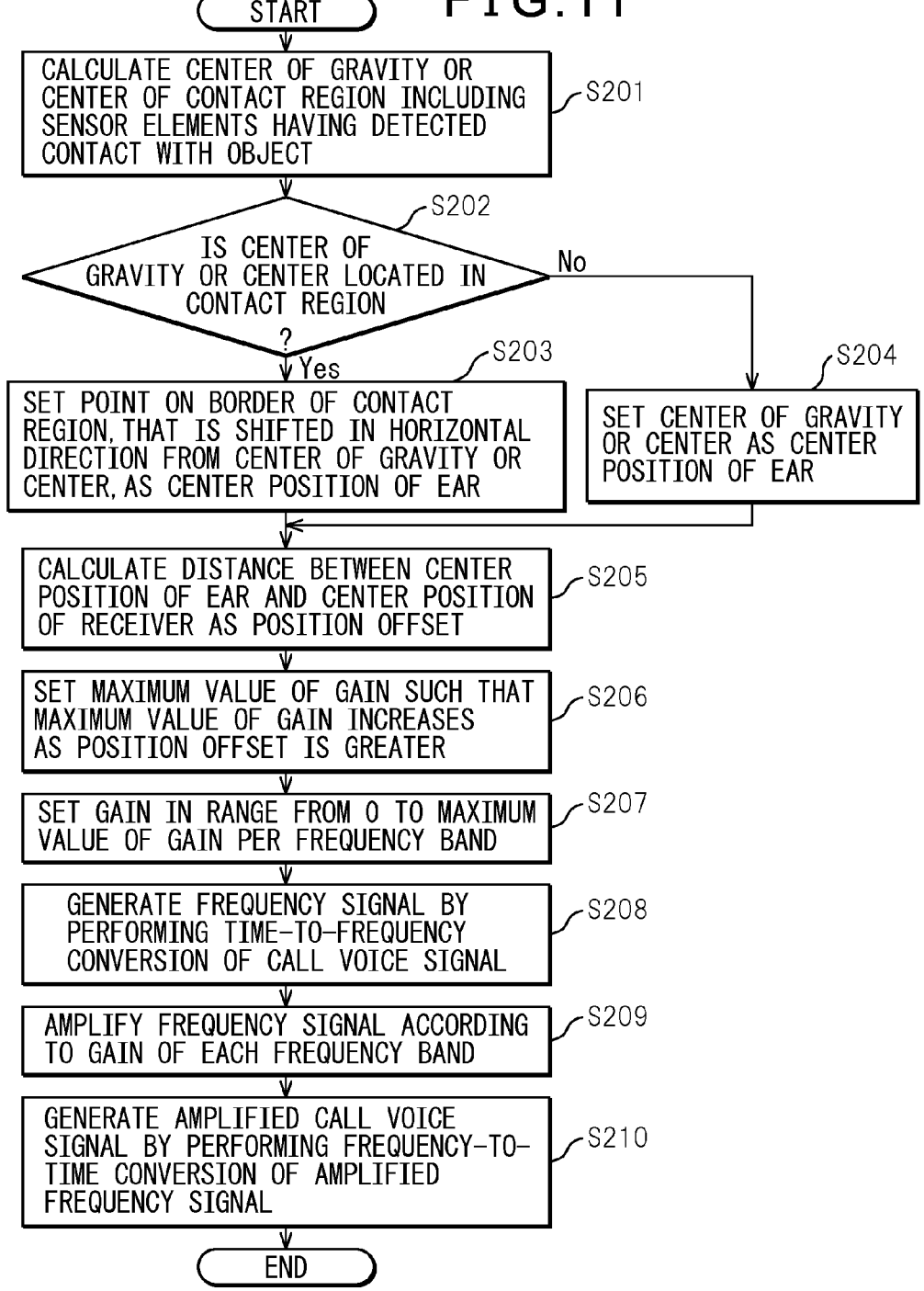
FIG. 11 is an operation flowchart of a voice adjustment process according to a second embodiment.

FIG. 11 is an operation flowchart of a voice adjustment process according to the second embodiment. This voice adjustment process is controlled by the controller 31.

Based on a contact position signal received from the touch sensor 15, the ear position estimation unit 21 of the controller 31 finds the center of gravity or center of a contact region including a sensor element having detected contact with an object (step S201). The ear position estimation unit 21 determines whether or not the center of gravity or center is located in the contact region (step S202). When the center of gravity or center is not located in the contact region (step S202—No), the ear position estimation unit 21 determines that the center of gravity or center is the center position of the ear (step S203). On the other hand, when the center of gravity or center is located in the contact region (step S202—Yes), the ear position estimation unit 21 determines that the border of the contact region shifted in the horizontal direction from the center of gravity or center, is the ear center position (step S204). After step S203 or S204, the ear position estimation unit 21 outputs the center position of the ear to the position offset calculation unit 22 of the controller 31.

The position offset calculation unit 22 calculates the distance between the center position of the receiver 13 that is stored in the memory 16, and the center position of the ear, on a surface that is parallel to the front surface 10a of the housing 10, as the position offset (step S205). Then, the position offset calculation unit 22 outputs the position offset to the volume/quality adjustment unit 23 of the controller 31.

The volume/quality adjustment unit 23 determines the maximum value of gain such that, as the position offset is greater, the maximum value of gain also is greater (step S206). Then, the volume/quality adjustment unit 23 determines the gain for each frequency band, in the range from 0 to the maximum value of gain (step S207). For example, the volume/quality adjustment unit 23 sets the gain higher as the frequency increases higher.

In addition, the time-frequency conversion unit 24 of the controller 31 generates a frequency signal by performing time-to-frequency conversion of a call voice signal that is produced from a radio signal received from another telephone, in predetermined frame units (step S208). The time-frequency conversion unit 24 outputs the generated frequency signal to the volume/quality adjustment unit 23. The volume/quality adjustment unit 23 amplifies the frequency signal depending on the gain of each frequency band (step S209). Then, the volume/quality adjustment unit 23 outputs the amplified frequency signal to the frequency-time conversion unit 25 of the controller 31.

The frequency-time conversion unit 25 generates an amplified call voice signal by performing frequency-to-time conversion of the amplified frequency signal in predetermined frame units (step S210). The frequency-time conversion unit 25 outputs the call voice signal to the receiver 13.

For example, during execution of the call process, the controller 31 executes the processes of steps S201 to S207 of this voice adjustment process, every predetermined period of time, for example, every 10 seconds, 30 seconds or 1 minute. Alternately, every time an object to contact with the touch sensor 15 is detected, the controller 31 may execute the processes of steps S201 to S207 of this voice adjustment process. Further, the controller 31 executes the processes of steps S208 to S210, for each frame of the call voice.

As described above, the mobile phone according to the second embodiment amplifies the call voice signal on a per frequency band basis. Then, this mobile phone increases the maximum value of gain greater as the distance between the center position of the ear and the receiver increases, and also adjusts the gain per frequency band. Consequently, even if the user's ear comes apart from the receiver, this mobile phone is able to selectively amplify the signal of a frequency band that is prone to attenuate or a frequency band that is important to human voice or hearing, and therefore is able to adjust the quality or volume of the call voice so that the user is able to hear the call voice easily.

Next, a mobile phone according to a third embodiment will be described. The mobile phone according to the third embodiment amplifies the call voice signal depending on the area of the user's ear contacting with the mobile phone.

Note that, comparing the mobile phone according to the third embodiment with the mobile phone according to the first embodiment, the processes to be executed by the controller are different. Therefore, the controller of the mobile phone according to the third embodiment will be described below. As for the details of the other components of the mobile phone according to the third embodiment, see FIG. 1 and the descriptions of corresponding components in the mobile phone according to the first embodiment.

Figure 12:
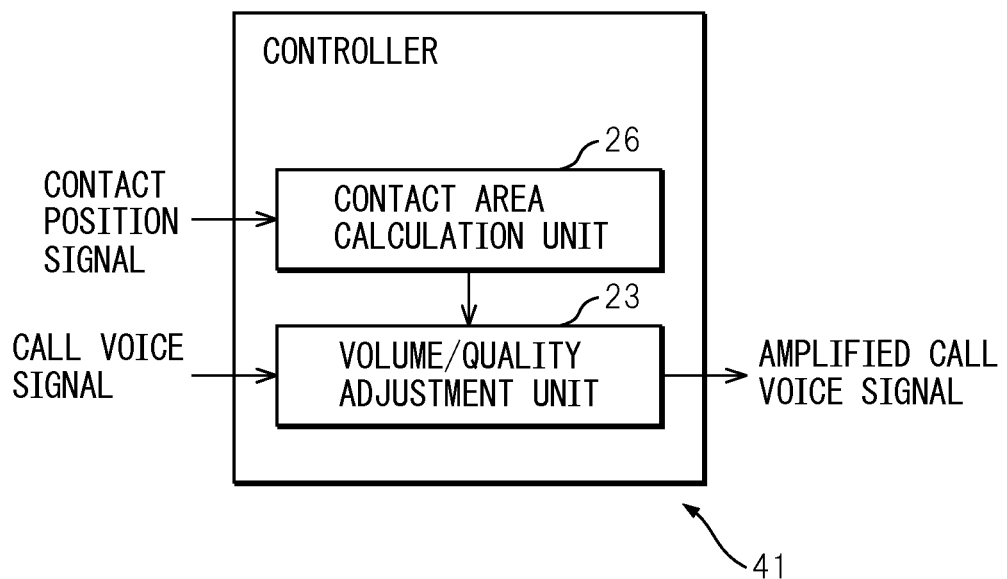
FIG. 12 is a schematic configuration diagram of a controller of a mobile phone related to functions for adjusting voice according to a third embodiment.

FIG. 12 is a schematic configuration diagram of the controller of the mobile phone related to functions for adjusting voice according to the third embodiment.

The controller 41 includes a contact area calculation unit 26 and a volume/quality adjustment unit 23. These units provided in the controller 41 are implemented as a computer program to be executed on a processor provided in the controller 41. Alternately, the units provided in the controller 41 may be mounted as separate operation circuits in the mobile phone 1, or may be mounted in the mobile phone 1 as one operation circuit to implement the functions of these units.

Note that, in FIG. 12, each unit of the controller 41 is assigned the same reference numeral as the reference numeral of the corresponding component in the controller 17 of the mobile phone according to the first embodiment illustrated in FIG. 2.

The contact area calculation unit 26 estimates the area of the contact region in the user's ear contacting with the touch sensor 15, based on a contact position signal received from the touch sensor 15 while the controller 41 is executing the call process.

To be more specific, among a plurality of sensor elements provided in the touch sensor 15, the contact area calculation unit 26 determines the total number of sensor elements having detected contact with an object as the area S of the contact region. Alternately, the contact area calculation unit 26 may determine the value given by multiplying the total number of sensor elements having detected contact with an object, by the area of the sensor surface provided in the sensor elements, as the area S of the contact region. Then, the contact area calculation unit 26 outputs the area S of the contact region to the volume/quality adjustment unit 23.

The volume/quality adjustment unit 23 adjusts the volume of call depending on the area S of the contact region.

Generally speaking, when it is difficult that the user hears the sound produced from the receiver 13, the user tries to bring the ear close to the receiver 13 as much as possible. Then, as the ear approaches closer to the receiver 13, the area of the contact region between the touch sensor 15 provided in the front surface of the receiver 13 and the ear increases. On the other hand, when the user feels that the sound produced from the receiver 13 is too loud, the user tries to bring the ear apart from the receiver 13. As a result, the area of the contact region between the touch sensor 15 and the ear decreases.

In this way, the area of the contact region serves as an indicator for determining whether or not the call voice is easy to hear for the user, and, in particular, when the area of the contact region is greater, the user is more likely to be thinking that the call voice is difficult to hear. Therefore, the volume/quality adjustment unit 23 adjusts the volume of call such that the volume of call increases as the area S of the contact region is larger.

Figure 13:
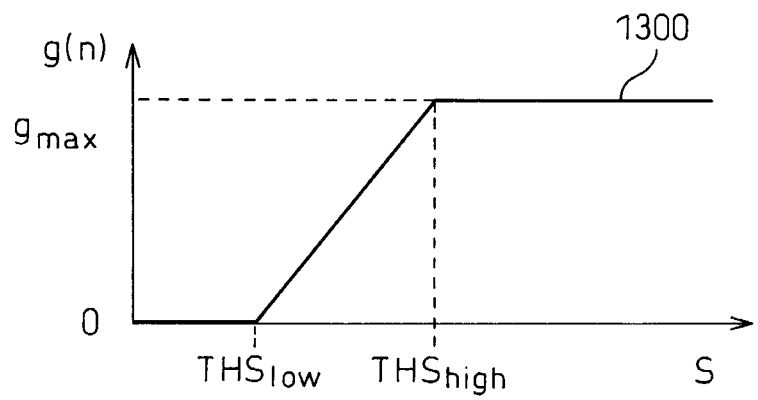
FIG. 13 is a graph illustrating relationship between the area of the contact region in which the ear contacts with the touch sensor, and gain.

FIG. 13 is a graph illustrating the relationship between the area of the contact region between the ear and the touch sensor, and gain. In FIG. 13, the horizontal axis represents the area S of the contact region, and the vertical axis represents the gain g(n). The graph 1300 represents the gain g(n) versus the area S of the contact region.

As illustrated in FIG. 13, when the area S of the contact region is smaller than a threshold value $THS_{low}$, the volume/ quality adjustment unit 23 sets the gain g(n) to 0. On the other hand, when the area S of the contact region is equal to or larger than a threshold value $THS_{high}$, the volume/quality adjustment unit 23 sets the gain g(n) to the maximum gain $g_{max}$. Then, when the area S of the contact region is equal to or greater than the threshold value $THS_{low}$ and is lower than $THS_{high}$, the volume/quality adjustment unit 23 increases the gain g(n) monotonously as the area S of the contact region increases larger. For example, the volume/quality adjustment unit 23 increases the gain g linearly as the area S of the contact region increases larger. Then, in this case, when the area S of the contact region is a midpoint between $THS_{low}$ and $THS_{high}$, the volume/quality adjustment unit 23 sets the gain g(n) to $g_{max}/2$. Note that n is the number of a sample point of the call voice. The maximum gain $g_{max}$ is set, for example, to 10 dB.

Note that the threshold value $THS_{low}$ is set to a value corresponding to the average value of the area of the contact region between the ear and the mobile phone when the user feels that the call voice can be heard good, measured in advance by experiment and so on. On the other hand, the threshold value $THS_{high}$ is set to a value corresponding to the average value of the area of the contact region between the ear and the mobile phone when the user feels that the call voice is difficult to hear, and presses the ear against the mobile phone, measured in advance by experiment and so on.

For example, when each sensor element provided in the touch sensor has a sensor surface of 1 $mm^2$ in size, the threshold value $THS_{low}$ and the threshold value $THS_{high}$ are set to 720 and 790, respectively.

The volume/quality adjustment unit 23 amplifies the call voice in accordance with equation (6), using the gain g(n), in the same way as in the first embodiment. The volume/quality adjustment unit 23 outputs the amplified call voice signal to the receiver 13.

Figure 14:
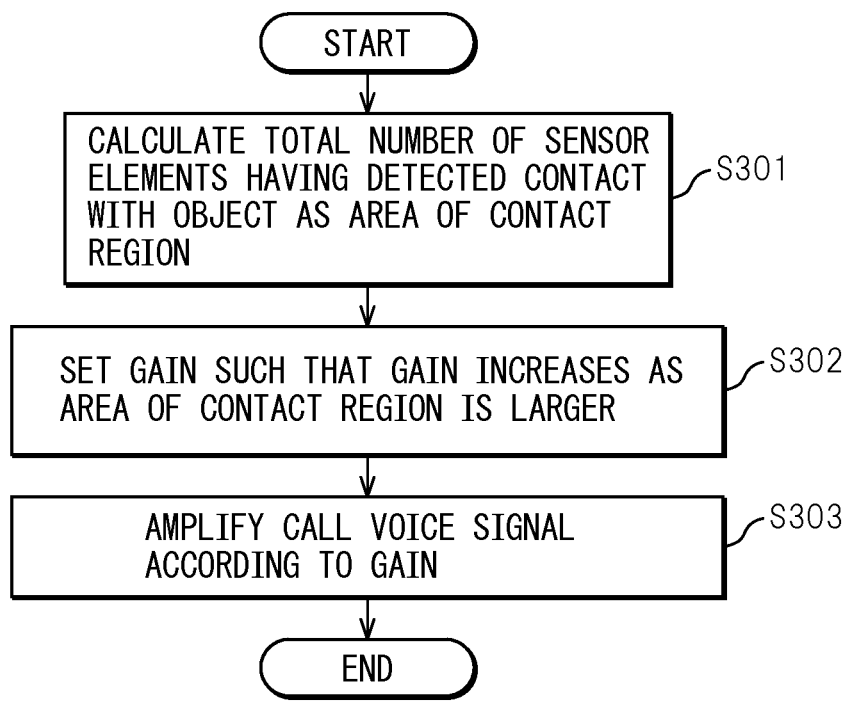
FIG. 14 is an operation flowchart of a voice adjustment process according to a third embodiment.

FIG. 14 is an operation flowchart of the voice adjustment process according to the third embodiment. This voice adjustment process is controlled by the controller 41.

Based on a contact position signal received from the touch sensor 15, the contact area calculation unit 26 of the controller 41 finds the total number of sensor elements having detected contact with an object, as the area of the contact region between the ear and the receiver 13 (step S301). The contact area calculation unit 26 outputs that area of the contact region to the volume/quality adjustment unit 23 of the controller 41.

The volume/quality adjustment unit 23 determines the gain such that, when the area of the contact region increases larger, the gain also increases higher (step S302). Then, the volume/quality adjustment unit 23 amplifies the call voice signal depending on the determined gain (step S303). The volume/quality adjustment unit 23 outputs the amplified call voice signal to the receiver 13.

For example, during execution of the call process, the controller 41 executes the processes of steps S301 and S302 of this voice adjustment process, every predetermined period of time, for example, every 10 seconds, 30 seconds or 1 minute. Alternately, every time an object to contact with the touch sensor 15 is detected, the controller 41 may execute the processes of steps S301 and S302 of this voice adjustment process. In addition, the controller 41 executes the process of step S303 for each call voice sample point.

As described above, the mobile phone according to the third embodiment increases the gain of the call voice signal to be output from the receiver, as the contact area between the user's ear and a touch sensor, which is detected by the touch sensor provided near the front surface of the housing, becomes greater. Consequently, this mobile phone is able to adequately adjust the volume of the call voice.

Next, a mobile phone according to a fourth embodiment will be described. The mobile phone according to the fourth embodiment amplifies the call voice signal, per frequency band, depending on the area of the contact region between the user's ear and a touch sensor.

Note that, comparing the mobile phone according to the fourth embodiment with the mobile phone according to the first embodiment, the processes to be executed by the controller are different. Therefore, the controller of the mobile phone according to the fourth embodiment will be described below. As for the details of the other components of the mobile phone according to the fourth embodiment, see FIG. 1 and the descriptions of corresponding components in the mobile phone according to the first embodiment.

Figure 15:
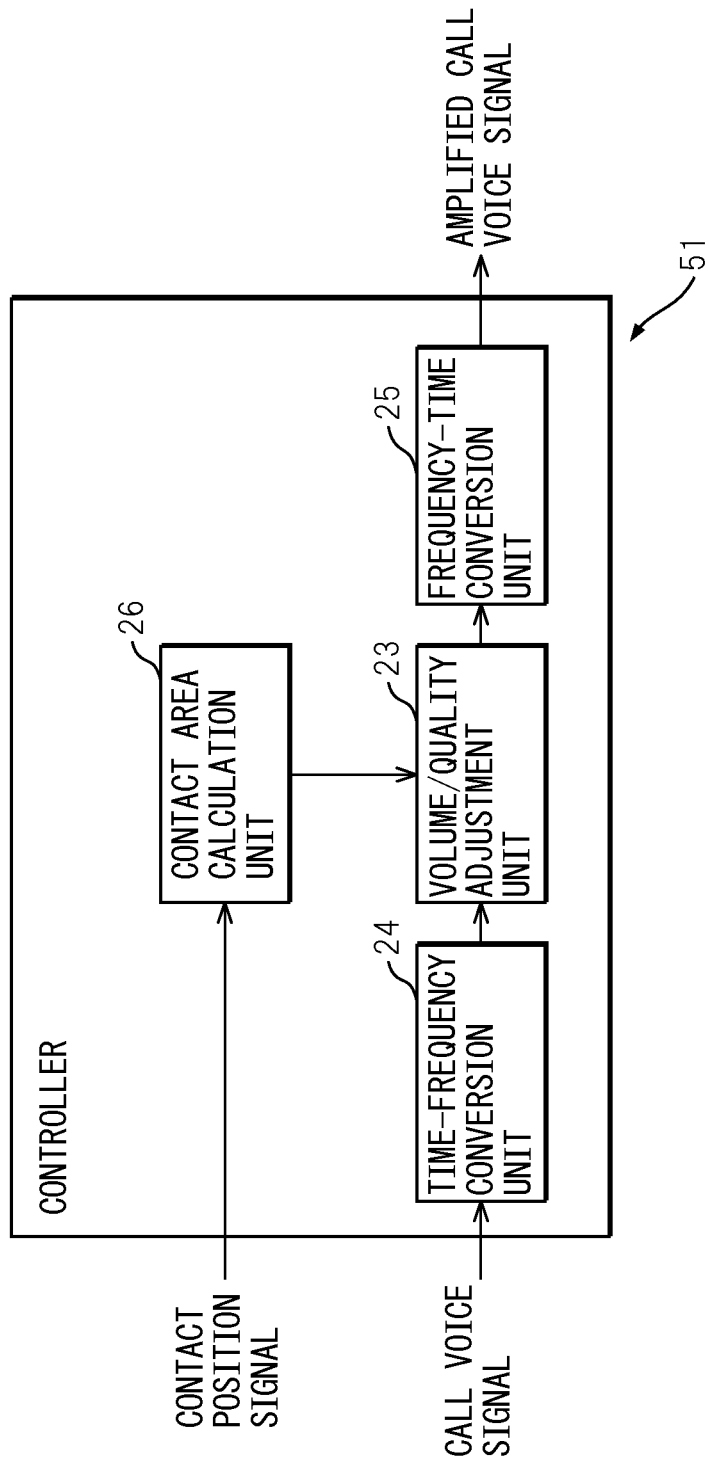
FIG. 15 is a schematic configuration diagram of a controller of a mobile phone related to functions for adjusting voice according to a fourth embodiment.

FIG. 15 is a schematic configuration diagram of the controller of the mobile phone related to functions for adjusting voice according to the fourth embodiment.

The controller 51 includes a volume/quality adjustment unit 23, a time-frequency conversion unit 24, a frequency-time conversion unit 25, and a contact area calculation unit 26. These units provided in the controller 51 are implemented as a computer program to be executed on a processor provided in the controller 51. Alternately, the units provided in the controller 51 may be mounted as separate operation circuits in the mobile phone 1, or may be mounted in the mobile phone 1 as one operation circuit to implement the functions of these units.

Note that, in FIG. 15, each unit of the controller 51 is assigned the same reference numeral as the reference numeral of the corresponding component in the controller of the mobile phone according to one of the first to third embodiments illustrated in FIG. 2, FIG. 7 and FIG. 12. Among each unit of the controller 51, the contact area calculation unit 26 is the same as the contact area calculation unit 26 of the controller 41 according to the third embodiment. Further, among each unit of the controller 51, the time-frequency conversion unit 24 and the frequency-time conversion unit 25 is the same as the time-frequency conversion unit 24 and the frequency-time conversion unit 25 of the controller 31 according to the second embodiment, respectively.

The volume/quality adjustment unit 23 of the controller 51 determines the maximum gain $G_{max}$ per frequency band, depending on the area of the contact region between the ear and the touch sensor 15, determined by the contact area calculation unit 26.

Figure 16:
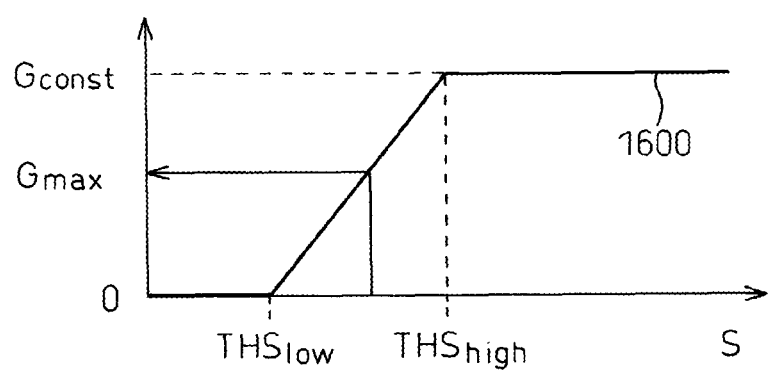
FIG. 16 is a graph illustrating relationship between the area of the contact region in which the ear contacts with the touch sensor, and the maximum gain.

FIG. 16 is a graph illustrating the relationship between the area of the contact region between the ear and the touch sensor, and the maximum gain. In FIG. 16, the horizontal axis represents the area S of the contact region, and the vertical axis represents the maximum value $G_{max}$ of gain. The graph 1600 is the maximum value $G_{max}$ of gain versus the area S of the contact region.

As illustrated in FIG. 16, when the area S of the contact region is lower than a threshold value $THS_{low}$, the volume/quality adjustment unit 23 sets the maximum value of gain $G_{max}$ to 0. On the other hand, when the area S of the contact region is equal to or greater than a threshold value $THS_{high}$, the volume/quality adjustment unit 23 sets the maximum value of gain $G_{max}$ to a predetermined value $G_{const}$. Note that the predetermined value $G_{const}$ is set, for example, to 10 dB. Then, when the area S of the contact region is equal to or greater than the threshold value $THS_{low}$ and is lower than $THS_{high}$, the volume/quality adjustment unit 23 increases the maximum value of gain $G_{max}$ monotonously as the area S of the contact region increases greater. For example, the volume/quality adjustment unit 23 increases the maximum value of gain $G_{max}$ linearly as the area S of the contact region becomes larger. Then, when the area S of the contact region is a midpoint between $THS_{low}$ and $THS_{high}$, the volume/quality adjustment unit 23 sets the maximum value of gain $G_{max}$ to $G_{const}/2$. Then, when the area S of the contact region is equal to or greater than the threshold value $THS_{low}$ and is lower than $THS_{high}$, the volume/quality adjustment unit 23 may increase the maximum value of gain $G_{max}$ non-linearly as the area S of the contact region increases greater.

Note that the threshold values $THS_{low}$ and $THS_{high}$ are set the same as the threshold values $THS_{low}$ and $THS_{high}$ for determining the gain g(n) in the volume/quality adjustment unit 23 according to the third embodiment.

When the maximum gain is determined, the volume/quality adjustment unit 23 determines the gain of each frequency band. The volume/quality adjustment unit 23 determines the gain of each frequency band such that the gain increases as the frequency is lower, or the gain for a specific frequency band is greater than for other frequency bands. The volume/quality adjustment unit 23 is able to determine the gain per frequency band, using the characteristics of gain versus frequency illustrated in FIG. 9, for example, in the same way as the volume/quality adjustment unit 23 according to the second embodiment.

As a result, the volume/quality adjustment unit 23 sets the gain for a frequency band lower than the threshold value $THS_{high}$ to a greater value than the gain for a frequency band higher than the threshold value $THS_{high}$, as the area S of the contact region increases larger.

Alternately, the volume/quality adjustment unit 23 may determine the gain of each frequency band using the characteristics of gain versus frequency illustrated in FIG. 10.

The volume/quality adjustment unit 23 amplifies the frequency signal, per frequency band, in accordance with equation (7). Then, the volume/quality adjustment unit 23 outputs the amplified frequency signal to the frequency-time conversion unit 25.

Figure 17:
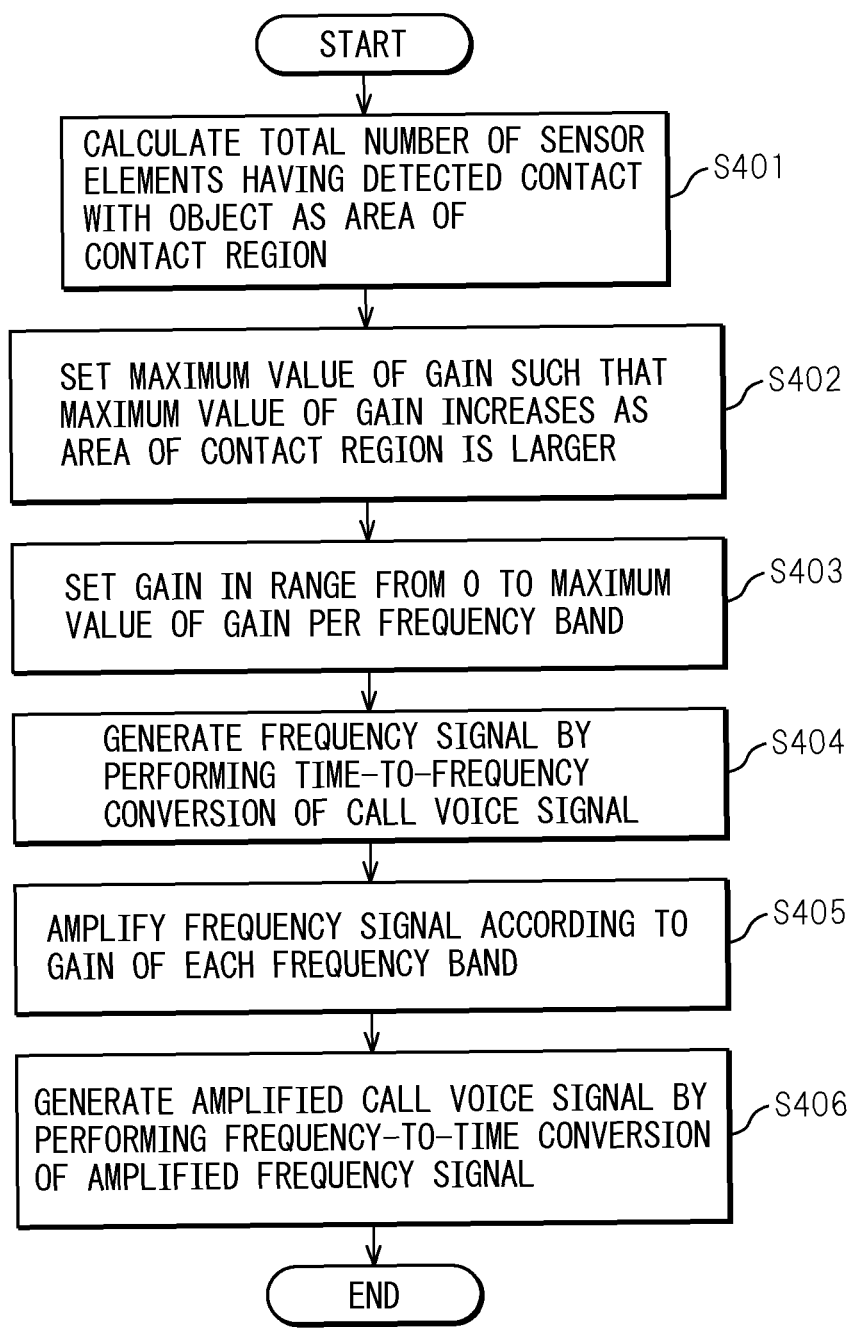
FIG. 17 is an operation flowchart of a voice adjustment process according to a fourth embodiment.

FIG. 17 is an operation flowchart of the voice adjustment process according to the fourth embodiment. This voice adjustment process is controlled by the controller 51.

Based on a contact position signal received from the touch sensor 15, the contact area calculation unit 26 of the controller 51 finds the total number of sensor elements having detected contact with an object, as the area of the contact region between the ear and the receiver 13 (step S401). The contact area calculation unit 26 outputs that area of the contact region, to the volume/quality adjustment unit 23 of the controller 51.

The volume/quality adjustment unit 23 determines the maximum value of gain such that, as the area of the contact region increases larger, the maximum value of gain also increases higher (step S402). Then, the volume/quality adjustment unit 23 determines gain, per frequency band, in the range from 0 to the maximum value of gain (step S403). For example, the volume/quality adjustment unit 23 sets gain lower as the frequency increases higher. Alternately, the volume/quality adjustment unit 23 sets the gain for a specific frequency band higher than the gain for the other frequency bands.

The time-frequency conversion unit 24 of the controller 51 generates a frequency signal by performing time-to-frequency conversion of a call voice signal produced from a radio signal received from another telephone, in predetermined frame units (step S404). The time-frequency conversion unit 24 outputs the generated frequency signal to the volume/quality adjustment unit 23. The volume/quality adjustment unit 23 amplifies the frequency signal depending on the gain of each frequency band (step S405). Then, the volume/quality adjustment unit 23 outputs the amplified frequency signal to the frequency-time conversion unit 25 of the controller 51.

The frequency-time conversion unit 25 generates an amplified call voice signal by performing frequency-to-time conversion of the amplified frequency signal in predetermined frame units (step S406). The frequency-time conversion unit 25 outputs the call voice signal to the receiver 13.

For example, during execution of the call process, the controller 51 executes the processes of steps S401 to S403 of this voice adjustment process, every predetermined period of time, for example, every 10 seconds, 30 seconds or 1 minute. Alternately, every time an object to contact with the touch sensor 15 is detected, the controller 51 may execute the processes of steps S401 to S403 of this voice adjustment process. Further, the controller 51 may execute the processes of steps S404 to S406 for each frame of the call voice.

As described above, the mobile phone according to the fourth embodiment amplifies the call voice signal on a per frequency band basis. Then, this mobile phone increases the maximum value of gain greater as the distance between the center position of the ear and the receiver increases, and also adjusts the gain on a per frequency band basis. Consequently, when the user's ear is pressed against the mobile phone harder, this mobile phone is able to selectively amplify the signal of a specific frequency band, and therefore is able to adjust the quality or volume of the call voice so that the user is able to hear the call voice easily.

Next, a mobile phone according to a fifth embodiment will be described. The mobile phone according to the fifth embodiment amplifies the call voice signal depending on a result of comparison of an average value of the area of the contact region in which the user's ear contacts with the mobile phone, and the area of the contact region at the present time.

Note that, comparing the mobile phone according to the fifth embodiment with the mobile phones according to the first embodiment and third embodiment, the processes to be executed by the controller are different. Therefore, the controller of the mobile phone according to the fifth embodiment will be described below. As for the details of the other components of the mobile phone according to the fifth embodiment, see FIG. 1 and the descriptions of corresponding components in the mobile phone according to the first embodiment.

Figure 18:
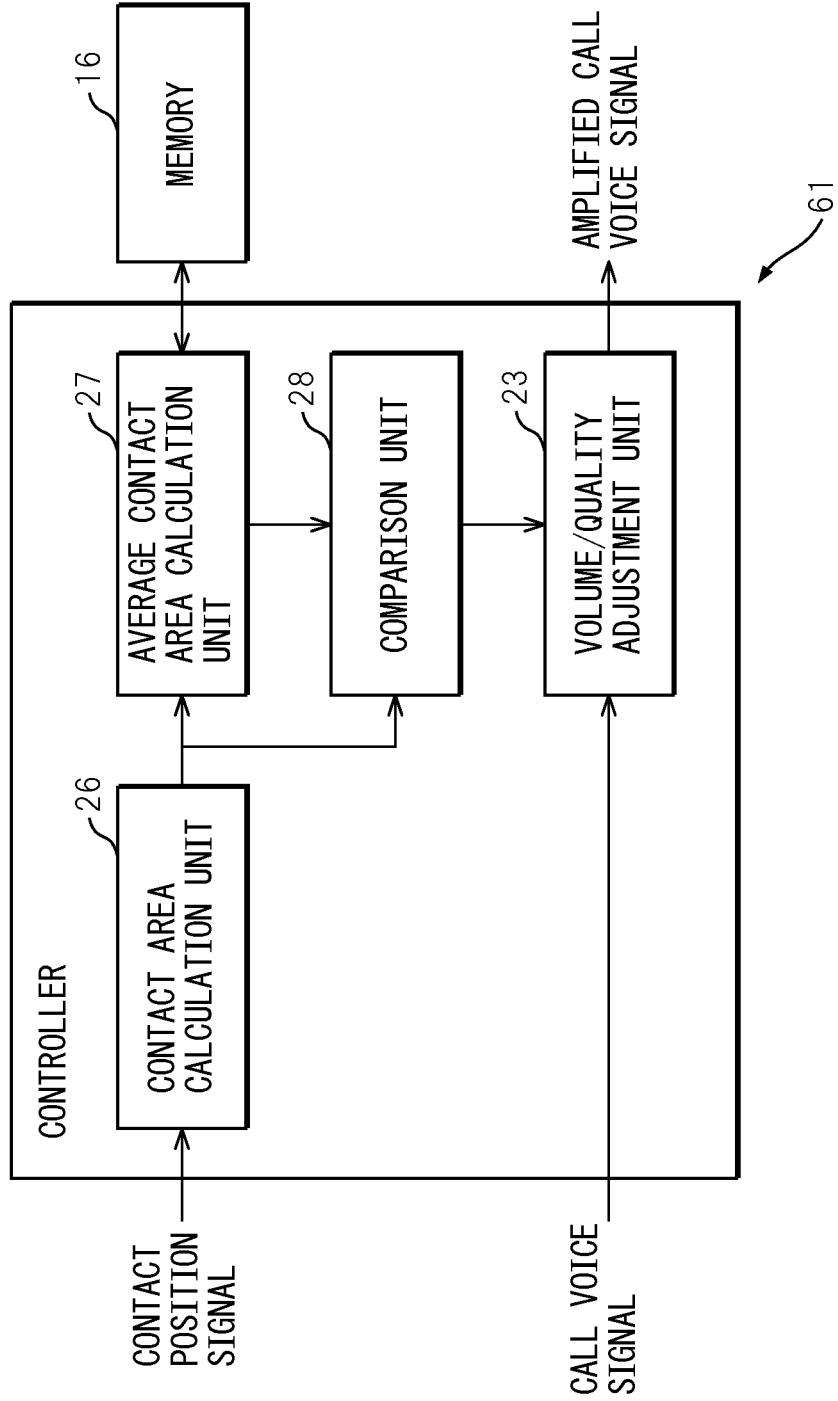
FIG. 18 is a schematic configuration diagram of a controller of a mobile phone related to functions for adjusting voice according to a fifth embodiment.

FIG. 18 is a schematic configuration diagram of the controller of the mobile phone related to functions for adjusting voice according to the fifth embodiment.

The controller 61 includes a volume/quality adjustment unit 23, a contact area calculation unit 26, an average contact area calculation unit 27, and a comparison unit 28. These units provided in the controller 61 are implemented as a computer program to be executed on a processor provided in the controller 61. Alternately, the units provided in the controller 61 may be mounted as separate operation circuits in the mobile phone 1, or may be mounted in the mobile phone 1 as one operation circuit to implement the functions of these units.

Note that, in FIG. 18, each unit of the controller 61 is assigned the same reference numeral as the reference numeral of the corresponding component in the controller 41 of the mobile phone according to the third embodiment illustrated in FIG. 12.

The contact area calculation unit 26 estimates the area of the contact region between the user's ear and the touch sensor 15, in the same way as in the contact area calculation unit 26 of the controller 41 according to the third embodiment. The contact area calculation unit 26 outputs that area of the contact region to the average contact area calculation unit 27 and the comparison unit 28.

The average contact area calculation unit 27 calculates the average value of the area of the contact region between the user's ear and the touch sensor 15 for temporal variation of the area, in accordance with the following equation:

$$S_{Ave}(m) = a \cdot S(m) + b \cdot S_{Ave}(m-1) \quad (8)$$

$S(m)$ is the latest area of the contact region. $S_{ave}(m)$ is the latest average value of the area of the contact region. In addition, $S_{ave}(m-1)$ is the average value of the area of the contact region as of when the area of the contact region was calculated last time. Upon calculating the average value of the area of the contact region, the average contact area calculation unit 27 reads this $S_{ave}(m-1)$ from the memory 16, which is provided in the mobile phone 1. Note that the initial value of $S_{ave}(m-1)$ is set to the area of the contact region as of when a person is able to sufficiently hear the voice produced from the receiver 13, and is stored in advance in the memory 16. In addition, a and b are forgetting factors, and these forgetting factors a and b are set to hold a+b=1, where, for example, a=0.01 and b=0.99.

The average contact area calculation unit 27, every time calculating the average value $S_{ave}(m)$ of the area of the contact region, stores the average value $S_{ave}(m)$ in the memory 16, and also outputs that average value $S_{ave}(m)$ to the comparison unit 28.

The comparison unit 28 finds the difference $\Delta S$ (=$S(m)$−$S_{ave}(m)$) between the latest area $S(m)$ of the contact region, and the average value $S_{ave}(m)$ of the area of the contact region. Then, the comparison unit 28 outputs that difference $\Delta S$ to the volume/quality adjustment unit 23.

The volume/quality adjustment unit 23 determines the gain based on the difference $\Delta S$ between the latest area $S(n)$ of the contact region and the average value $S_{ave}(n)$ of the area of the contact region.

Generally speaking, as the absolute value of $\Delta S$ is smaller, the area of the contact region between the user's ear and the touch sensor 15 in the latest state is closer to the area of the contact region between the ear and touch sensor 15 in a regular state when the user hears the call voice. Then, in the regular state, it is estimated that the user is able to sufficiently hear the voice produced from the receiver 13. Consequently, when the absolute value of $\Delta S$ is smaller, it is estimated that the in-call volume is set to an adequate value.

On the other hand, as $\Delta S$ is greater, the user presses the ear against the mobile phone 1 harder than in the regular state, so that it is estimated that it is difficult to hear the call voice for the user. Consequently, as $\Delta S$ is greater, the volume/quality adjustment unit 23 may preferably set gain higher. On the other hand, as $\Delta S$ is smaller, the user is holding the ear distant from the mobile phone 1 than a distance between the ear and the mobile phone 1 in the regular state, so that it is estimated that the volume of call is too loud for the user. Consequently, as $\Delta S$ is smaller, the volume/quality adjustment unit 23 may preferably set the gain lower.

Figure 19:
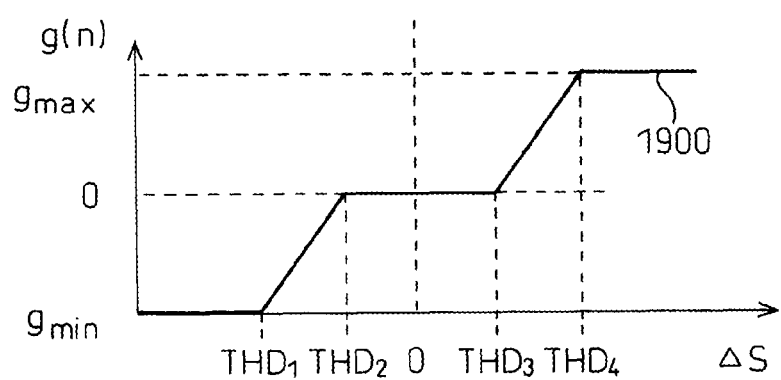
FIG. 19 is a graph illustrating relationship between the difference between the area of the contact region and its average value, and gain.

FIG. 19 is a graph illustrating the relationship between the difference between the area of the contact region and its average value, and gain. In FIG. 19, the horizontal axis represents the difference $\Delta S$ of the area of the contact region, and the vertical axis represents the gain $g(n)$. The graph 1900 illustrates the gain $g(n)$ versus the difference $\Delta S$ of the area of the contact region.

As illustrated in FIG. 19, when the difference $\Delta S$ in the area of the contact region is equal to or greater than the threshold value $THD_2$ and is lower than $THD_3$, the volume/quality adjustment unit 23 sets the gain $g(n)$ to 0. On the other hand, when the difference $\Delta S$ of the area of the contact region is equal to or greater than a threshold value $THD_4$, the volume/quality adjustment unit 23 sets the gain $g(n)$ to the maximum gain $g_{max}$. Then, when the difference $\Delta S$ of the area of the contact region is equal to or greater than a threshold value $THD_3$ and is lower than $THD_4$, as the difference $\Delta S$ of the area of the contact region increases greater, i.e., as the area of the contact region at the present time is larger than the area of the contact region in the regular state, the volume/quality adjustment unit 23 increases the gain g monotonously. For example, the volume/quality adjustment unit 23 increases the gain $g(n)$ linearly depending on the difference $\Delta S$ of the area of the contact region, and, when the difference $\Delta S$ is a midpoint between $THD_3$ and $THD_4$, the volume/quality adjustment unit 23 sets the gain $g(n)$ to $g_{max}/2$.

On the other hand, when the difference $\Delta S$ is lower than the threshold value $THD_1$, the volume/quality adjustment unit 23 sets the gain $g(n)$ to $g_{min}$. Then, when the difference $\Delta S$ is equal to or greater than a threshold value $THD_1$ and is lower than $THD_2$, as the difference $\Delta S$ of the area of the contact region becomes smaller, i.e., when the area of the contact region at the present time is smaller than the area of the contact region in the regular state, the volume/quality adjustment unit 23 decreases the gain $g(n)$ monotonously. For example, the volume/quality adjustment unit 23 decreases the gain $g(n)$ linearly as the absolute value of the difference $\Delta S$ increases larger, and, when the difference $\Delta S$ is a midpoint between $THD_1$ and $THD_2$, the volume/quality adjustment unit 23 sets the gain $g(n)$ to $g_{min}/2$.

Note that n is the number of a sample point of the call voice. The maximum gain $g_{max}$ and minimum gain $g_{min}$ are set, for example, to 10 dB and −10 dB, respectively.

Note that the threshold value $THD_1$ is set, for example, to a value corresponding to a state in which the ear is apart from the mobile phone 1. The threshold values $THD_2$ and $THD_3$ are set to, for example, values corresponding to the lower limit value and the upper limit value of the area of the contact region between the ear and the touch sensor 15 in the regular state. Then, threshold value $THD_4$ is set, for example, to a value corresponding to the case where the user presses the ear against the mobile phone 1 harder than in a regular state. For example, when each sensor element provided in the touch sensor 15 has a sensor surface of 1 mm² in area, the threshold values $THD_1$ to $THD_4$ are set to −$S_{ave}(n)$, −10, 10 and 90, respectively.

The volume/quality adjustment unit 23 amplifies the call voice, using gain $g(n)$, in accordance with equation (6), in the same way as the first embodiment. The volume/quality adjustment unit 23 outputs the amplified call voice signal to the receiver 13.

Figure 20:
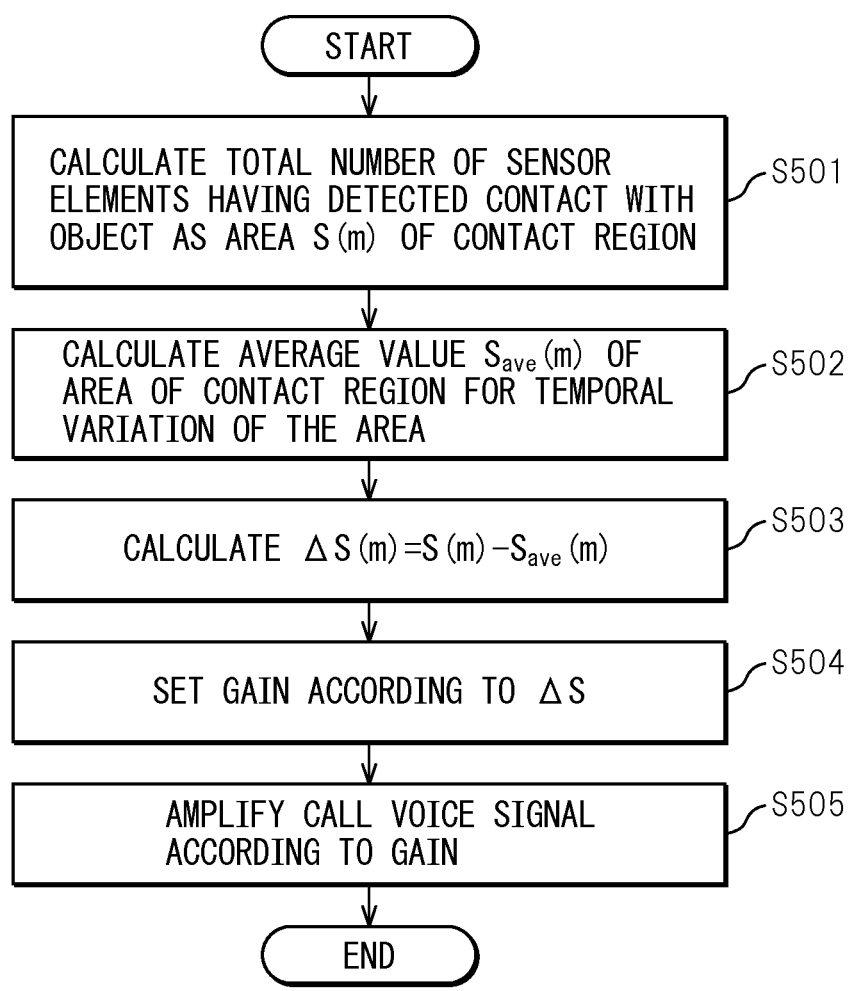
FIG. 20 is an operation flowchart of a voice adjustment process according to a fifth embodiment.

FIG. 20 is an operation flowchart of a voice adjustment process according to fifth embodiment. This voice adjustment process is controlled by the controller 61.

Based on a contact position signal received from the touch sensor 15, the contact area calculation unit 26 of the controller 61 finds the total number of sensor elements having detected contact with an object, as the area of the contact region between the ear and the receiver 13 (step S501). The contact area calculation unit 26 outputs the area $S(m)$ of the contact region, to the average contact area calculation unit 27 and the comparison unit 28 of the controller 61.

The average contact area calculation unit 27 calculates the average value $S_{ave}(m)$ of the area of the contact region for temporal variation of the area (step S502). The average contact area calculation unit 27 stores the average value $S_{ave}(m)$ in the memory 16, and outputs the average value $S_{ave}(m)$ to the comparison unit 28. The comparison unit 28 calculates the difference ΔS(m) between the latest area S(m) of the contact region and the average value $S_{ave}(m)$ of the area of the contact region (step S503). Then, the comparison unit 28 outputs the difference ΔS(m) to the volume/quality adjustment unit 23 of the controller 61.

The volume/quality adjustment unit 23 determines the gain depending on the difference ΔS (step S504). Then, the volume/quality adjustment unit 23 amplifies the call voice signal depending on the determined gain (step S505). The volume/quality adjustment unit 23 outputs the amplified call voice signal to the receiver 13.

For example, during execution of the call process, the controller 61 executes the processes of steps S501 to S504 of this voice adjustment process, every predetermined period of time, for example, every 10 seconds, 30 seconds or 1 minute. Alternately, every time an object to contact with the touch sensor 15 is detected, the controller 61 may execute the processes of steps S501 to S504 of this voice adjustment process. In addition, the controller 61 may execute the process of step S505 for each sample point of the call voice.

As described above, the mobile phone according to the fifth embodiment adjusts the volume of call that is output from the receiver depending on the difference between the area of the contact region between the user's ear and the touch sensor in the regular state, and the area of the contact region between the user's ear and the touch sensor in the latest state. In this way, this mobile phone is able to adjust the volume of the call voice based on a regular state. In addition, the area of the contact region corresponding to the regular state is sequentially updated. Consequently, as the user keeps using this mobile phone, this mobile phone is able to adjust the volume of call more adequately for the user.

Note that, as a variation of the mobile phone according to the fifth embodiment, the controller may calculate the position offset between the receiver and the center position of the user's ear, instead of the area of the contact region, and calculate an average value of the position offset for temporal variation of the position offset. Then, the controller may adjust the gain depending on the difference between the position offset in the latest state and the average value of the position offset. In this case, the controller is able to set the gain higher as the difference is greater, or, on the other hand, set the gain lower as the difference becomes a greater negative value.

Next, a mobile phone according to a sixth embodiment will be described. The mobile phone according to the sixth embodiment adjusts the gain of a call voice signal based on both the area of the contact region between the user's ear and the touch sensor and the position offset between the user's ear and the receiver.

Note that, comparing the mobile phone according to the sixth embodiment with the mobile phones according to the first embodiment and third embodiment, the processes to be executed by the controller are different. Therefore, the controller of the mobile phone according to the sixth embodiment will be described below. As for the details of the other components of the mobile phone according to the sixth embodiment, see FIG. 1 and the descriptions of corresponding components in the mobile phone according to the first embodiment.

Figure 21:
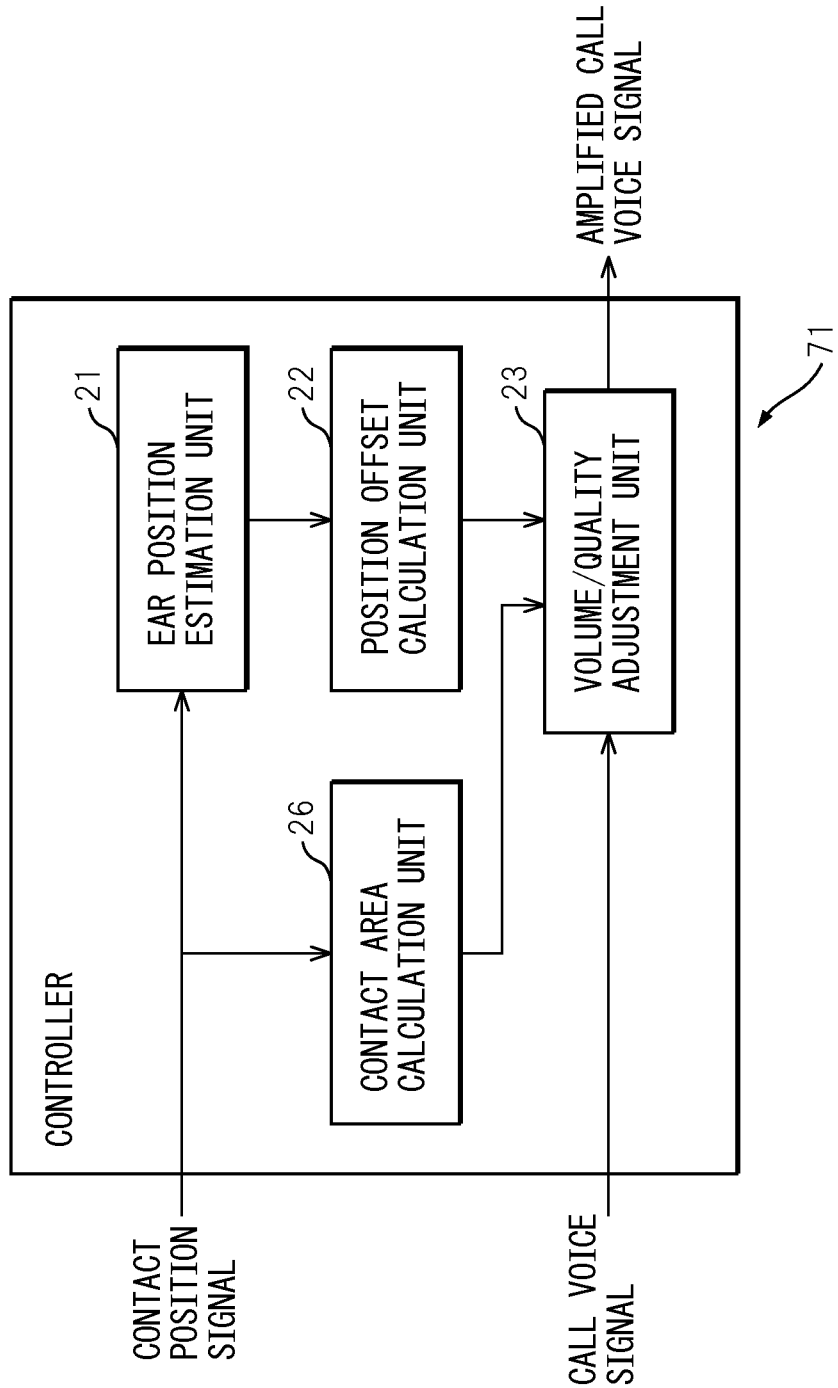
FIG. 21 is a schematic configuration diagram of a controller of a mobile phone related to functions for adjusting voice according to a sixth embodiment.

FIG. 21 is a schematic configuration diagram of the controller of the mobile phone related to functions for adjusting voice according to the sixth embodiment.

The controller 71 includes an ear position estimation unit 21, a position offset calculation unit 22, a volume/quality adjustment unit 23, and a contact area calculation unit 26.

These units provided in the controller 71 are implemented as a computer program to be executed on a processor provided in the controller 71. Alternately, the units provided in the controller 71 may be mounted as separate operation circuits in the mobile phone 1, or may be mounted in the mobile phone 1 as one operation circuit to implement the functions of these units.

Note that, in FIG. 21, each unit of the controller 71 is assigned the same reference numeral as the reference numeral of the corresponding component in the controller 17 of the mobile phone according to the first embodiment illustrated in FIG. 2 and the controller 41 of the mobile phone according to the third embodiment illustrated in FIG. 12.

The ear position estimation unit 21 estimates the center position of the ear, based on the contact position signal received from touch sensor 15 while the controller 71 is executing the call process. Then, the ear position estimation unit 21 outputs the center position of the ear to the position offset calculation unit 22.

The position offset calculation unit 22 calculates the distance L between the center position of the ear and the center position of the receiver 13 on a surface that is parallel to the front surface 10a of the housing 10 of the mobile phone 1, as the position offset. Then, the position offset calculation unit 22 outputs the position offset to the volume/quality adjustment unit 23.

Note that the ear position estimation unit 21 and the position offset calculation unit 22 are the same as the ear position estimation unit 21 and the position offset calculation unit 22 provided in the controller 17 of the mobile phone according to the first embodiment. As for the details of the ear position estimation unit 21 and the position offset calculation unit 22, see the corresponding descriptions for the first embodiment.

The contact area calculation unit 26 calculates the area S of the contact region between the ear and the touch sensor 15 based on a contact position signal received from the touch sensor 15 while the controller 71 is executing the call process. Then, the contact area calculation unit 26 outputs the area S of the contact region to the volume/quality adjustment unit 23.

Note that the contact area calculation unit 26 is the same as the contact area calculation unit 26 provided in the controller 41 of the mobile phone according to the third embodiment. Consequently, as for the details of the contact area calculation unit 26, see the corresponding descriptions given in relationship to the third embodiment.

The volume/quality adjustment unit 23 adjusts the gain such that, as the position offset L is greater, or as the area S of the contact region is larger, the gain also increases greater. However, in order to prevent excessive distortion of the call voice signal, the volume/quality adjustment unit 23 sets the gain to be equal to or lower than a maximum gain $g_{max}$ that is set in advance. In the present embodiment, the volume/quality adjustment unit 23 first finds the gain $g_L(n)$ depending on the position offset L. Then, the volume/quality adjustment unit 23 corrects the gain g(n), depending on the area S of the contact region, within a range from $g_{max}$ to $g_L(n)$, which is determined depending on the position offset L.

Figure 22:
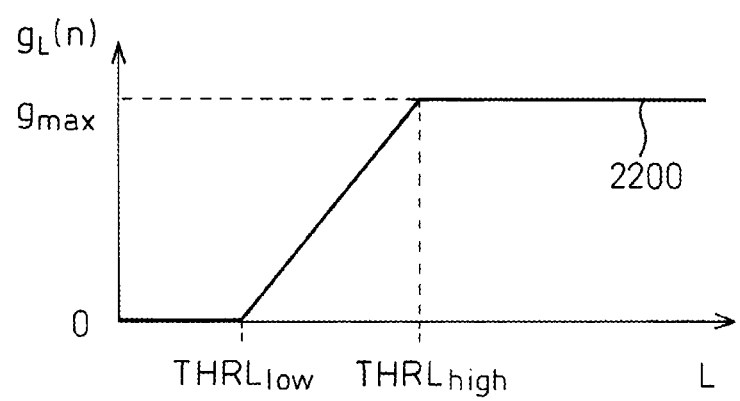
FIG. 22 is a graph illustrating relationship between the position offset between the center position of the ear and the receiver, and gain.

FIG. 22 is a graph illustrating the relationship between the position offset between the center position of the ear and the receiver, and gain. In FIG. 22, the horizontal axis represents the position offset L, and the vertical axis represents the gain $g_L(n)$. The graph 2200 illustrates the gain versus the position offset.

As illustrated in FIG. 22, when the position offset L is lower than a threshold value $THR_{low}$, the volume/quality adjustment unit 23 sets the gain $g_L(n)$ to 0. On the other hand, when the position offset L is equal to or greater than a threshold value $THR_{high}$, the volume/quality adjustment unit 23 sets the gain $g_L(n)$ to the maximum gain $g_{max}$. Then, when the position offset L is equal to or greater than the threshold value $THR_{low}$ and is lower than $THR_{high}$, the volume/quality adjustment unit 23 increases the gain $g_L(n)$ monotonously as the position offset L increases greater. For example, the volume/quality adjustment unit 23 increases the gain $g_L(n)$ linearly as the position offset L becomes greater. Then, when the position offset L is a midpoint between $THR_{low}$ and $THR_{high}$, the volume/quality adjustment unit 23 sets the gain $g_L(n)$ to $g_{max}/2$. Note that n is the number of a sample point of the call voice. The maximum gain $g_{max}$ is set, for example, to 10 dB.

Note that the threshold value $THR_{low}$ is set, for example, to a value corresponding to the radius or diameter of the earhole, for example, 5 mm. In addition, the threshold value $THR_{high}$ is set, for example, to a value corresponding to the distance from the earhole to the earlobe, for example, 40 mm.

Figure 23:
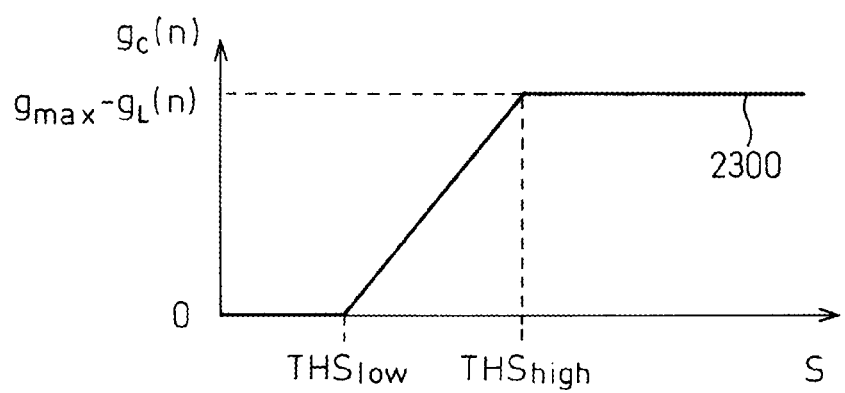
FIG. 23 is a graph illustrating relationship between the area of the contact region in which the ear contacts with the touch sensor, and the amount of correction of gain.

FIG. 23 is a graph illustrating the relationship between the area of the contact region between the ear and the touch sensor, and the amount of correction of gain. In FIG. 23, the horizontal axis represents the area S of the contact region, and the vertical axis represents the amount of correction of gain $g_C(n)$. The graph 2300 represents the amount of correction of gain $g_C(n)$ versus the area S of the contact region.

As illustrated in FIG. 23, when the area S of the contact region is lower than a threshold value $THS_{low}$, the volume/quality adjustment unit 23 sets the amount of correction of gain $g_C(n)$ to 0. On the other hand, when the area S of the contact region is equal to or greater than a threshold value $THS_{high}$, the volume/quality adjustment unit 23 sets the amount of correction of gain $g_C(n)$ to the difference ($g_{max} - g_L(n)$) between the maximum gain $g_{max}$ and the gain $g_L(n)$ that is set depending on the position offset L. Then, when the area S of the contact region is equal to or greater than the threshold value $THS_{low}$ and is lower than $THS_{high}$, the volume/quality adjustment unit 23 increases the amount of correction of gain $g_C(n)$ monotonously as the area S of the contact region increases larger. For example, the volume/quality adjustment unit 23 increases the amount of correction of gain $g_C(n)$ linearly as the area S of the contact region becomes larger. Then, when the area S of the contact region is a midpoint between $THS_{low}$ and $THS_{high}$, the volume/quality adjustment unit 23 sets the gain $g_C(n)$ to $(g_{max}-g_L(n))/2$. Note that n is the number of a sample point of the call voice.

Note that the threshold value $THS_{low}$ is set to a value corresponding to the average value of the area of the contact region between the ear and the mobile phone when the user can sufficiently hear the call voice, measured in advance by experiment and so on. On the other hand, the threshold value $THS_{high}$ is set to a value corresponding to the average value of the area of the contact region between the ear and the mobile phone when it is difficult to hear the call voice for the user, and presses the ear against the mobile phone, measured in advance by experiment and so on.

The volume/quality adjustment unit 23 calculates the corrected gain g(n) by adding the amount of correction of gain $g_C(n)$ that is determined depending on the area S of the contact region, to the gain $g_L(n)$ that is determined depending on the position offset L. Then, the volume/quality adjustment unit 23 amplifies the call voice signal using the corrected gain g(n), in accordance with equation (6), and outputs the amplified call voice signal to the receiver 13.

FIG. 24 is an operation flowchart of the voice adjustment process according to the sixth embodiment. This voice adjustment process is controlled by the controller 71.

The ear position estimation unit 21 of the controller 71 determines the center of gravity or center of a contact region including sensor elements having detected contact with an object, based on a contact position signal received from the touch sensor 15 (step S601). The ear position estimation unit 21 determines whether or not the center of gravity or center is located in the contact region (step S602). When the center of gravity or center is not located in the contact region (step S602—No), the ear position estimation unit 21 determines that the center of gravity or center is the center position of the ear (step S603). On the other hand, when the center of gravity or center is located in the contact region (step S602—Yes), the ear position estimation unit 21 determines that the border of the contact region shifted in the horizontal direction from the center of gravity or center is the ear center position (step S604). In step S603 or S604, the ear position estimation unit 21 outputs the center position of the ear to the position offset calculation unit 22 of the controller 71.

The position offset calculation unit 22 calculates the distance between the center position of the receiver 13 stored in the memory 16, and the center position of the ear, on a surface that is parallel to the front surface 10a of the housing 10, as the position offset (step S605). Then, the position offset calculation unit 22 outputs the position offset to the volume/quality adjustment unit 23 of the controller 71.

In addition, based on the contact position signal received from the touch sensor 15, the contact area calculation unit 26 of the controller 71 finds the total number of sensor elements having detected contact with an object, as the area of the contact region between the ear and the receiver 13 (step S606). The contact area calculation unit 26 outputs the area of the contact region, to the volume/quality adjustment unit 23.

The volume/quality adjustment unit 23 determines the gain $g_L(n)$ such that, as the position offset increases greater, the gain $g_L(n)$ also increases higher (step S607). Further, the volume/quality adjustment unit 23 calculates the gain correction value $g_C(n)$ such that, as the area of the contact region increases larger, the gain correction value $g_C(n)$ also increases higher (step S608). Then, the volume/quality adjustment unit 23 calculates the corrected gain g(n) by adding the correction value $g_C(n)$ to the gain $g_L(n)$ (step S609). The volume/quality adjustment unit 23 amplifies the call voice signal depending on the gain (step S610). Then, the volume/quality adjustment unit 23 outputs the amplified call voice signal to the receiver 13.

For example, during execution of the call process, the controller 71 executes the processes of steps S601 to S609 of this voice adjustment process, every predetermined period of time, for example, every 10 seconds, 30 seconds or 1 minute. Alternately, every time an object in contact with the touch sensor 15 is detected, the controller 71 may execute the processes of steps S601 to S609 of this voice adjustment process. Further, the controller 71 executes the process of step S610, for each sample point of the call voice.

As described above, the mobile phone of the sixth embodiment determined the gain based on the distance between the center position of the ear and the receiver, and based on the area of the contact region between the ear and the touch sensor. Consequently, this mobile phone is able to adjust the in-call volume more adequately.

Note that, as a variation of the mobile phone according to the sixth embodiment, the controller may calculate the gain based on the area of the contact region and calculate the amount of correction of gain based on the position offset between the receiver and the center position of the user's ear. In this case, the controller determines the gain for the call voice signal by adding the amount of correction of gain, which is calculated based on the position offset, to the gain that is calculated based on the area.

Further, the controller of the mobile phone according to each embodiment may receive a contact position signal from the touch sensor, not only during the call process, but also during execution of an application to output sound from the receiver, and adjust the volume and quality of the sound produced by the application.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiments of the present inventions have been described in detail, it should be understood that the various changes, substitutions, and alternations could be made hereto without departing from the spirit and scope of the invention.

What is claimed is:

1. A telephone comprising:
    a housing;
    a voice output device that is placed inside the housing and produces voice;
    a contact detection unit that detects a position of an object that contacts with the housing;
    a position offset calculation unit that calculates a distance between the contact position of the object detected by the contact detection unit and the voice output device; and
    a voice adjustment unit that adjusts the voice produced from the voice output device, depending on the distance.

2. The telephone according to claim 1, wherein the distance is a distance between the contact position of the object detected by the contact detection unit and the voice output device, on a contact surface of the housing.

3. The telephone according to claim 1, wherein the voice adjustment unit increases volume of the voice as the distance becomes longer.

4. The telephone according to claim 1, further comprising:
    a time-frequency conversion unit that generates a frequency signal, by performing time-to-frequency conversion of a first voice signal that is received as input; and
    a frequency-time conversion unit that generates a second voice signal to output to the voice output device, by performing frequency-to-time conversion of the frequency signal,
    wherein, as the distance becomes longer, the voice adjustment unit makes a first amount of amplification for a signal of a first frequency band included in the frequency signal greater than a second amount of amplification for a signal of a second frequency band that is higher than the first frequency band, amplifies the frequency signal using the first amount of amplification and the second amount of amplification, and outputs the amplified frequency signal to the frequency-time conversion unit.

5. The telephone according to claim 1, further comprising an object position estimation unit that finds a center of gravity or center of a region where the contact detection unit and the object contact, and, when the center of gravity or center is located in the region, detects a border of the region near the center of gravity or center as the position of the object.

6. The telephone according to claim 1, further comprising a contact area calculation unit that calculates an area of a contact region between the contact detection unit and the object,
    wherein the voice adjustment unit increases the volume of the voice as the area of the contact region becomes larger.

7. A voice adjustment method for a telephone comprising a housing and a voice output device that is placed inside the housing and produces voice, the voice adjustment method comprising:
    detecting a position of an object that contacts with the housing;
    calculating a distance between the detected contact position between the object and the voice output device; and
    adjusting the voice produced from the voice output device, depending on the distance.

8. The voice adjustment method according to claim 7, wherein the distance is a distance between the contact position of the object and the voice output device, on a contact surface of the housing.

9. The voice adjustment method according to claim 7, wherein the adjusting the voice increases volume of the voice as the distance becomes longer.

10. The voice adjustment method according to claim 7, further comprising:
    generating a frequency signal, by performing time-to-frequency conversion of a first voice signal that is received as input; and
    generating a second voice signal to output to the voice output device, by performing frequency-to-time conversion of an amplified frequency signal,
    wherein, as the distance becomes longer, the adjusting the voice makes a first amount of amplification for a signal of a first frequency band included in the frequency signal greater than a second amount of amplification for a signal of a second frequency band that is higher than the first frequency band, and generates the amplified frequency signal by amplifying the frequency signal using the first amount of amplification and the second amount of amplification.

11. The voice adjustment method according to claim 7, further comprising:
    finding a center of gravity or center of a region where the housing and the object contact; and
    when the center of gravity or center is located in the region, detecting a border of the region near the center of gravity or center as the position of the object.

12. The voice adjustment method according to claim 7, further comprising:
    calculating an area of a contact region between the housing and the object,
    wherein the adjusting the voice increases the volume of the voice as the area of the contact region becomes larger.

13. A telephone comprising:
    a housing;
    a voice output device that is placed inside the housing and produces voice;
    a contact area calculation unit that calculates an area of a contact region between the housing and a object; and
    a voice adjustment unit that adjusts the voice produced from the voice output device, depending on the area of the contact region.

14. The telephone according to claim 13, wherein the voice adjustment unit increases volume of the voice as the area of the contact region becomes larger.

15. The telephone according to claim 13, further comprising:
    a time-frequency conversion unit that generates a frequency signal, by performing time-to-frequency conversion of a first voice signal that is received as input; and a frequency-time conversion unit that generates a second voice signal to output to the voice output device, by performing frequency-to-time conversion of the frequency signal, wherein, as the area of the contact region becomes larger, the voice adjustment unit makes a first amount of amplification for a signal of a first frequency band included in the frequency signal greater than a second amount of amplification for a signal of a second frequency band that is higher than the first frequency band, amplifies the frequency signal using the first amount of amplification and the second amount of amplification, and outputs the amplified frequency signal to the frequency-time conversion unit.

16. The telephone according to claim 13, further comprising:

an average contact area calculation unit that calculates an average value of the area of the contact region for temporal variation of the area; and a comparison unit that calculates a difference between a latest value of the area of the contact region and the average value, wherein the voice adjustment unit increases the volume of the voice as an absolute value of the difference becomes bigger, when the difference is negative.

17. A voice adjustment method for a telephone comprising a housing and a voice output device that is placed inside the housing and produces voice, the voice adjustment method comprising:

calculating an area of a contact region between the housing and an object; and adjusting the voice produced from the voice output device, depending on the area of the contact region.

18. The voice adjustment method according to claim 17, wherein the adjusting the voice increases volume of the voice as the area of the contact region becomes larger.

19. The voice adjustment method according to claim 17, further comprising:

generating a frequency signal, by performing time-to-frequency conversion of a first voice signal that is received as input; and generating a second voice signal to output to the voice output device, by performing frequency-to-time conversion of an amplified frequency signal, wherein, as the area of the contact region becomes larger, the adjusting the voice makes a first amount of amplification for a signal of a first frequency band included in the frequency signal greater than a second amount of amplification for a signal of a second frequency band that is higher than the first frequency band, and generates the amplified frequency signal by amplifying the frequency signal using the first amount of amplification and the second amount of amplification.

20. The voice adjustment method according to claim 17, further comprising:

calculating an average value of the area of the contact region for temporal variation of the area; and calculating a difference between a latest value of the area of the contact region and the average value, wherein the adjusting the voice increases the volume of the voice as an absolute value of the difference becomes bigger, when the difference is negative.

* * * * *